(12) United States Patent
Raab

(10) Patent No.: US 10,274,333 B2
(45) Date of Patent: *Apr. 30, 2019

(54) NAVIGATION USING ROUTINE DRIVING INFORMATION AND DESTINATION AREAS

(71) Applicant: DISH NETWORK CORPORATION, Englewood, CO (US)

(72) Inventor: Stefan Bernard Raab, South Riding, VA (US)

(73) Assignee: DISH Network Corporation, Englewood, CO (US)

(*) Notice: Subject to any disclaimer, the term of this patent is extended or adjusted under 35 U.S.C. 154(b) by 0 days.

This patent is subject to a terminal disclaimer.

(21) Appl. No.: 15/590,167

(22) Filed: May 9, 2017

(65) Prior Publication Data

US 2017/0241793 A1 Aug. 24, 2017

Related U.S. Application Data

(63) Continuation of application No. 14/827,158, filed on Aug. 14, 2015, now Pat. No. 9,664,526, which is a
(Continued)

(51) Int. Cl.
*H04B 1/38* (2015.01)
*G01C 21/34* (2006.01)
(Continued)

(52) U.S. Cl.
CPC ......... *G01C 21/3492* (2013.01); *G01C 21/00* (2013.01); *G01C 21/26* (2013.01);
(Continued)

(58) Field of Classification Search
CPC ...... G06F 13/14; G06F 3/0484; H04W 4/046; H04W 4/001; H04W 84/005;
(Continued)

(56) References Cited

U.S. PATENT DOCUMENTS

| 4,992,947 A | 2/1991 | Nimura et al. |
| 5,394,561 A | 2/1995 | Freeburg |

(Continued)

FOREIGN PATENT DOCUMENTS

| EP | 1635482 A2 | 3/2006 |
| WO | WO200704737 A2 | 4/2007 |

OTHER PUBLICATIONS

U.S. Appl. No. 14/321,559, Amendment & Response, dated May 29, 2017, 13 pages.
(Continued)

*Primary Examiner* — Bobbak Safaipour
(74) *Attorney, Agent, or Firm* — Wash Park IP Ltd.; John T. Kennedy

(57) ABSTRACT

A method according to an embodiment of the invention is provided for identifying at least one routing option for use in routing a user from a current location to at least one destination comprising. The method includes the operations of: receiving electronic data identifying at least one destination; receiving electronic data indicating a current location; accessing, from the at least one memory device, historical information associated with at least one route segment, wherein the at least one route segment is interposed between the current location and the at least one destination; receiving, from at least one navigation service provider, a current condition for each of the at least one route segment; identifying, based on the current location, the historical information associated with at least one route segment, and the current condition for each of the at least one route segment, at least one routing option for use in routing a user from the current location to the at least one destination; and outputting at least one navigation direction, wherein the at least one navigation direction include an identification of the at least one routing option.

22 Claims, 15 Drawing Sheets

Related U.S. Application Data continuation of application No. 14/095,807, filed on Dec. 3, 2013, now Pat. No. 9,109,916, which is a continuation of application No. 12/042,207, filed on Mar. 4, 2008, now Pat. No. 8,626,230.

(51) Int. Cl.
*G01C 21/26* (2006.01)
*G01C 21/00* (2006.01)
*G01C 21/36* (2006.01)
*G08G 1/0968* (2006.01)
*G01C 21/32* (2006.01)

(52) U.S. Cl.
CPC ...... *G01C 21/3484* (2013.01); *G01C 21/3611* (2013.01); *G01C 21/3617* (2013.01); *G08G 1/096805* (2013.01); *G01C 21/32* (2013.01); *G01C 21/34* (2013.01)

(58) Field of Classification Search
CPC ..... H04W 48/18; H04W 12/02; H04W 12/08; H04W 12/12; H04W 4/008; H04W 4/02; H04W 8/205; H04M 1/2535; H04M 1/72536; H04M 2250/22
See application file for complete search history.

(56) References Cited

U.S. PATENT DOCUMENTS

| | | | |
|---|---|---|---|
| 5,758,261 A | 5/1998 | Wiedeman | |
| 5,919,246 A | 7/1999 | Waizmann et al. | |
| 6,212,473 B1 | 4/2001 | Stefan et al. | |
| 6,269,304 B1 | 7/2001 | Kaji et al. | |
| 6,360,167 B1 | 3/2002 | Millington et al. | |
| 6,405,129 B1 | 6/2002 | Yokota | |
| 6,484,094 B1 | 11/2002 | Wako | |
| 6,487,496 B2 | 11/2002 | Katayama et al. | |
| 6,505,118 B2 | 1/2003 | Chowanic et al. | |
| 6,522,865 B1 | 2/2003 | Otten | |
| 6,711,474 B1 | 3/2004 | Treyz et al. | |
| 6,714,760 B2 | 3/2004 | Robinett | |
| 6,714,860 B1 | 3/2004 | Wawra et al. | |
| 6,741,834 B1 | 5/2004 | Godwin | |
| 6,771,742 B2 | 8/2004 | McCalmont et al. | |
| 6,816,778 B2 | 11/2004 | Diaz | |
| 6,865,149 B1 | 3/2005 | Kalman et al. | |
| 6,941,222 B2 | 9/2005 | Yano et al. | |
| 6,944,139 B1 | 9/2005 | Campanella | |
| 6,950,625 B2 | 9/2005 | Regulinksi et al. | |
| 6,961,658 B2 | 11/2005 | Ohler | |
| 6,992,991 B2 | 1/2006 | Duske et al. | |
| 6,999,720 B2 | 2/2006 | Karabinis | |
| 7,013,205 B1* | 3/2006 | Hafner ................. B60L 11/126 180/165 |
| 7,017,175 B2 | 3/2006 | Alao et al. | |
| 7,031,702 B2 | 4/2006 | Karabinis et al. | |
| 7,071,842 B1 | 7/2006 | Brady | |
| 7,082,365 B2 | 7/2006 | Sheha et al. | |
| 7,136,661 B2 | 11/2006 | Graske et al. | |
| 7,164,661 B2 | 1/2007 | Kelly | |
| 7,174,127 B2 | 2/2007 | Otten et al. | |
| 7,176,813 B2 | 2/2007 | Kawamata et al. | |
| 7,194,270 B2 | 3/2007 | Smith | |
| 7,224,935 B2 | 5/2007 | Messina et al. | |
| 7,233,860 B2 | 6/2007 | Lokshin et al. | |
| 7,239,963 B2 | 7/2007 | Suzuki | |
| 7,242,948 B2 | 7/2007 | Fleischer et al. | |
| 7,269,503 B2 | 9/2007 | McGrath | |
| 7,271,742 B2 | 9/2007 | Sheha et al. | |
| 7,274,905 B1 | 9/2007 | Nguyen et al. | |
| 7,274,906 B1 | 9/2007 | Nguyen et al. | |
| 7,286,931 B2 | 10/2007 | Kawasaki | |
| 7,289,039 B2 | 10/2007 | Kato et al. | |
| 7,321,826 B2 | 1/2008 | Sheha | |
| 7,412,313 B2* | 8/2008 | Isaac ................. G01C 21/3679 701/123 |
| 7,469,184 B2* | 12/2008 | Isaac ................. G01C 21/3679 701/300 |
| 7,490,004 B2 | 2/2009 | Kimura | |
| 7,577,576 B2 | 8/2009 | Baechtiger | |
| 7,599,770 B2* | 10/2009 | Hardy ................. G01C 22/02 340/438 |
| 7,609,700 B1 | 10/2009 | Ying | |
| 7,610,151 B2 | 10/2009 | Letchner et al. | |
| 7,623,859 B2 | 11/2009 | Karabinis | |
| 7,765,055 B2 | 7/2010 | Cera et al. | |
| 7,778,591 B1 | 8/2010 | Van Hoff et al. | |
| 7,778,769 B2 | 8/2010 | Boss et al. | |
| 7,813,874 B2 | 10/2010 | Fujiwara | |
| 7,826,789 B2 | 11/2010 | Nord | |
| 7,908,076 B2* | 3/2011 | Downs ................. G08G 1/0104 701/117 |
| 8,060,389 B2 | 11/2011 | Johnson | |
| 8,099,086 B2 | 1/2012 | Singh et al. | |
| 8,457,682 B2* | 6/2013 | Raab ................. H04M 1/72536 455/550.1 |
| 9,276,664 B2* | 3/2016 | Zufall ................. H04B 7/18536 |
| 9,664,526 B2* | 5/2017 | Raab ................. G01C 21/26 |
| 9,939,286 B2* | 4/2018 | Raab ................. H04M 1/72536 |
| 2002/0065078 A1 | 5/2002 | Cohen et al. | |
| 2003/0154128 A1 | 8/2003 | Liga et al. | |
| 2004/0022326 A1 | 2/2004 | Morrish et al. | |
| 2004/0110467 A1 | 6/2004 | Wang | |
| 2004/0203919 A1* | 10/2004 | Ross ................. H04W 4/02 455/456.1 |
| 2004/0242152 A1 | 12/2004 | Jarett | |
| 2005/0055724 A1 | 3/2005 | Atad et al. | |
| 2005/0136832 A1 | 6/2005 | Spreizer | |
| 2005/0239404 A1 | 10/2005 | Karabinis | |
| 2006/0023656 A1 | 2/2006 | Anglin | |
| 2006/0160219 A1 | 7/2006 | Lee et al. | |
| 2006/0190981 A1 | 8/2006 | Weill et al. | |
| 2006/0217885 A1 | 9/2006 | Crady et al. | |
| 2006/0229807 A1* | 10/2006 | Sheha ................. G01C 21/3679 701/468 |
| 2006/0229810 A1 | 10/2006 | Cross et al. | |
| 2006/0253246 A1 | 11/2006 | Cera et al. | |
| 2007/0058083 A1 | 3/2007 | Kim | |
| 2007/0086460 A1 | 4/2007 | Choi et al. | |
| 2007/0087756 A1 | 4/2007 | Hoffberg | |
| 2007/0124789 A1* | 5/2007 | Sachson ................. G06Q 30/00 725/117 |
| 2007/0150174 A1* | 6/2007 | Seymour ............ G01C 21/3617 701/532 |
| 2007/0182592 A1 | 8/2007 | Lekovic | |
| 2007/0288162 A1* | 12/2007 | Furukawa ............ G01C 21/367 701/431 |
| 2008/0033639 A1 | 2/2008 | Nakamura et al. | |
| 2008/0071466 A1* | 3/2008 | Downs ................. G08G 1/0104 701/117 |
| 2008/0094250 A1* | 4/2008 | Myr .......................... G08G 1/04 340/909 |
| 2008/0125958 A1* | 5/2008 | Boss ................. G01C 21/3469 701/123 |
| 2008/0134260 A1 | 6/2008 | Glassman et al. | |
| 2008/0200114 A1 | 8/2008 | Eberlein et al. | |
| 2008/0228562 A1* | 9/2008 | Smith .................... G06Q 10/08 705/13 |
| 2008/0248815 A1* | 10/2008 | Busch .................... H04W 4/029 455/456.5 |
| 2008/0268838 A1* | 10/2008 | Zufall ................. H04B 7/18536 455/430 |
| 2008/0288406 A1* | 11/2008 | Seguin .................... G06Q 30/02 705/50 |
| 2008/0319642 A1* | 12/2008 | DeBie ................. G01C 21/3492 701/533 |
| 2009/0007185 A1 | 1/2009 | Nix | |
| 2009/0028318 A1* | 1/2009 | Bhogal ............ H04M 3/42263 379/211.02 |
| 2009/0118996 A1* | 5/2009 | Kantarjiev ........... G08G 1/0112 701/119 |

(56) References Cited

U.S. PATENT DOCUMENTS

| | | | |
|---|---|---|---|
| 2009/0228196 A1* | 9/2009 | Raab | G01C 21/26 |
| | | | 701/532 |
| 2011/0202266 A1* | 8/2011 | Downs | G08G 1/0104 |
| | | | 701/119 |
| 2012/0065872 A1 | 3/2012 | Nortrup | |
| 2012/0150425 A1 | 6/2012 | Chapman et al. | |
| 2012/0205437 A1 | 8/2012 | Sauerwein et al. | |
| 2012/0271541 A1 | 10/2012 | Hjelm et al. | |
| 2013/0166208 A1 | 6/2013 | Forstall | |
| 2016/0182168 A1* | 6/2016 | Zufall | H04B 7/18536 |
| | | | 455/3.02 |
| 2016/0182169 A1* | 6/2016 | Zufall | H04B 7/18536 |
| | | | 455/3.02 |

OTHER PUBLICATIONS

U.S. Appl. No. 14/321,559, Notice of Allowance, dated Jul. 6, 2017, 5 pages.
EP17155748, Extended European Search Report, dated Jun. 28, 2017, 3 pages.
EP17155748, Preliminary Report on Patentability, dated Jun. 28, 2017, 8 pages.
U.S. Appl. No. 15/046,091, Final Office Action, dated Jun. 16, 2017, 18 pages.
U.S. Appl. No. 15/055,856, Final Office Action, dated Jun. 28, 2017, 22 pages.
U.S. Appl. No. 15/055,856, RCE and Amendment, dated Sep. 26, 2018, 13 pages.
U.S. Appl. No. 15/055,874, Final Office Action, dated Sep. 20, 2018, 31 pages.
U.S. Appl. No. 15/923,343, Amendment & Response, dated Sep. 9, 2018, 15 pages.
U.S. Appl. No. 15/923,343, eTerminal Disclaimer, dated Sep. 9, 2018, 3 pages.
U.S. Appl. No. 15/046,091, Appellant's Reply Brief, dated Jun. 2, 2018, 9 pages.
U.S. Appl. No. 15/055,856, Final Office Action, dated Jun. 28, 2018, 19 pages.
U.S. Appl. No. 15/055,874, Response to Office Action, dated Jun. 2, 2018, 14 pages.
U.S. Appl. No. 15/923,343, Non-final Office Action, dated Jun. 14, 2018, 19 pages.
U.S. Appl. No. 14/827,158, Issue Notification, dated May 10, 2017, 1 page.
EP17155749.9, Extended European Search Report and Preliminary Opinion on Patentability, dated Jun. 29, 2017, 12 pages.
U.S. Appl. No. 15/055,874, Final Rejection, dated Jul. 14, 2017, 28 pages.
EP17155746.5, Extended European Search Report and Preliminary Report on Patentability, dated Jul. 3, 2017, 10 pages.
EP17155746.5, Notice of Publication, dated Jul. 5, 2017, 2 pages.
EP17155746.5, Publication, dated Aug. 2, 2017, 26 pages.
EP17155746.5, Communication Pursuant to Rules 70(2) and 70a(2), dated Aug. 7, 2017, 2 pages.
EP17155749.9, Notice of Intent to Publish, dated Jul. 5, 2017, 2 pages.
EP1755749.9, Publication, dated Aug. 2, 2017, 26 pages.
EP1755749.9, Communication Pursuant to Rules 70(2) and 70a(2), dated Aug. 7, 2017, 2 pages.
COTS Satellite—Terrestrial Broadcast System for Deployed Communications, NATO Consultation, Command and Control Agency (NC3A), Communications and Information Systems Division, The Hague, The Netherlands, Author: R. Segura, 2002, 6 pages.
U.S. Appl. No. 14/321,559, RCE, dated Aug. 29, 2017, 3 pages.
U.S. Appl. No. 15/046,091, Response to Final Action, dated Aug. 16, 2017, 20 pages.
U.S. Appl. No. 15/055,856, Response to Final Action, dated Aug. 28, 2017, 20 pages.
U.S. Appl. No. 14/321,559, RCE, dated Aug. 7, 2017, 3 pages.
U.S. Appl. No. 14/321,559, Notice of Allowance, dated Aug. 25, 2017, 5 pages.
U.S. Appl. No. 14/321,559, Prosecution Reopened, dated Sep. 29, 2017, 2 pages.
EP171557481.1, Notice of Intent to Publish, dated Jun. 28, 2017, 2 pages.
EP171557481.1, Communication pursuant to Rule 70(2) and 70a(2) EPC, dated Jul. 31, 2017, 2 pages.
U.S. Appl. No. 15/046,091, Notice of Appeal, Pre-appeal Conference Request and Brief, dated Oct. 16, 2017, 9 pages.
U.S. Appl. No. 15/055,856, Advisory Action and AFCP 2.0 Decision, dated Sep. 15, 2017, 5 pages.
U.S. Appl. No. 15/055,856, RCE filed, dated Sep. 21, 2017, 3 pages.
U.S. Appl. No. 15/055,874, Amendment & Response, dated Sep. 14, 2017, 17 pages.
U.S. Appl. No. 15/055,874, Advisory Action and AFCP 2.0 Decision, dated Oct. 5, 2017, 5 pages.
U.S. Appl. No. 15/055,874, Advisory Action Response filed with RCE, dated Oct. 12, 2017, 20 pages.
EP17155746.5, Response to Rule 70(2) Communication, dated Feb. 1, 2018, 20 pages.
EP171557481.1, Response to Rule 70(2) Communication, dated Jan. 24, 2018, 23 pages.
EP1755749.9, Response to Rule 70(2) Communication, dated Feb. 1, 2018, 22 pages.
U.S. Appl. No. 14/321,559, filed Jul. 1, 2014.
U.S. Appl. No. 14/321,559, Issue Notice, dated Mar. 22, 2018, 1 page.
U.S. Appl. No. 15/046,091, Examiner's Answer, dated Apr. 5, 2018, 25 pages.
U.S. Appl. No. 15/055,856, Amendment & Response, dated Mar. 14, 2018, 12 pages.
U.S. Appl. No. 15/055,874, Corrected Non-Final Office Action, dated Mar. 7, 2018, 32 pages.
U.S. Appl. No. 14/321,559, Notice of Allowance, dated Dec. 4, 2017, 5 pages.
U.S. Appl. No. 15/046,091, Pre-Appeal Conference Decision, dated Nov. 17, 2017, 2 pages.
U.S. Appl. No. 15/046,091, Appeal Brief, dated Jan. 8, 2018, 49 pages.
U.S. Appl. No. 15/055,856, Non-Final Office Action, dated Dec. 15, 2017, 21 pages.
U.S. Appl. No. 15/055,874, Non-Final Office Action, dated Feb. 9, 2018, 28 pages.
U.S. Appl. No. 15/923,343, Final Office Action, dated Dec. 31, 2018, 14 pages.
EP17155746.5, Examination Report, dated Jan. 25, 2019.
EP171557481.1, Exam Rpt, dated Jan. 25, 2019.
EP1755749.9, Exam Report, dated Jan. 28, 2019.
U.S. Appl. No. 15/055,856, Notice of Allowability, dated Jan. 10, 2019.
U.S. Appl. No. 15/055,856, Notice of Allowability, dated Feb. 21, 2019.
U.S. Appl. No. 15/055,874, Appeal Brief, dated Feb. 14, 2019.
U.S. Appl. No. 15/923,343, RCE, Amendment and Response, dated Mar. 11, 2019.
U.S. Appl. No. 15/046,091, filed Feb. 17, 2016.
U.S. Appl. No. 15/055,856, filed Feb. 29, 2016.
U.S. Appl. No. 15/055,874, filed Feb. 29, 2016.
U.S. Appl. No. 15/923,343, filed Mar. 16, 2018.
U.S. Appl. No. 16/290,780, filed Mar. 2, 2019.
U.S. Appl. No. 15/055,856, Notice of Allowance, dated Nov. 26, 2018, 10 pages.
U.S. Appl. No. 15/055,874, Notice of Appeal dated Dec. 19, 2018, 2 pages.

* cited by examiner

NAVIGATION USING ROUTINE DRIVING INFORMATION AND DESTINATION AREAS

CROSS REFERENCE TO RELATED APPLICATIONS

This application is a continuation of U.S. patent application Ser. No. 14/827,158, entitled "METHOD AND SYSTEM FOR USING ROUTINE DRIVING INFORMATION", filed Aug. 14, 2015, which is a continuation of U.S. patent application Ser. No. 14/095,807, entitled "METHOD AND SYSTEM FOR USING ROUTINE DRIVING INFORMATION IN MOBILE INTERACTIVE SATELLITE SERVICES", filed Dec. 3, 2013 and issued as U.S. Pat. No. 9,109,916 on Aug. 18, 2015, which is a continuation of U.S. patent application Ser. No. 12/042,207, entitled "METHOD AND SYSTEM FOR USING ROUTINE DRIVING INFORMATION IN MOBILE INTERACTIVE SATELLITE SERVICES," filed on Mar. 4, 2008 and issued as U.S. Pat. No. 8,626,230 on Jan. 7, 2014. The present application is also related to: U.S. patent application Ser. No. 13/619,848, entitled "METHOD AND SYSTEM FOR USING ROUTINE DRIVING INFORMATION IN MOBILE INTERACTIVE SATELLITE SERVICES", filed on Sep. 14, 2012 and issued as U.S. Pat. No. 8,942,620 on Jan. 27, 2015; and U.S. application Ser. No. 13/798,922, entitled "METHOD AND SYSTEM FOR USING ROUTINE DRIVING INFORMATION IN MOBILE INTERACTIVE SATELLITE SERVICES", filed on Mar. 13, 2013 and issued as U.S. Pat. No. 8,705,790 on Jun. 10, 2014. The contents of each of the above identified applications are incorporated by reference as if fully disclosed herein.

BACKGROUND

The invention relates generally to navigation and more particularly to devices providing interactive navigation services based on historical driving information and methods for using such devices.

A hybrid satellite and terrestrial communication system, such as a Mobile Satellite Services (MSS) system with an Ancillary Terrestrial Component (ATC), for example, can provide a more efficient spectrum utilization and a more effective coverage in rural and urban areas than can be provided by stand-alone mobile satellite systems. For that reason, existing MSS/ATC systems have been typically used to provide voice communication services that cover a wide geographic coverage. Using existing MSS/ATC systems to make available other types of services, however, poses many implementation challenges. For instance, to support mobile interactive services, an MSS/ATC system design may need to effectively handle multicast transmissions across both satellite networks and ancillary terrestrial networks along with interactive communications with individual users. A properly designed MSS/ATC system can support one or more mobile interactive services, including mobile or in-vehicle navigation services, for example.

In a typical in-vehicle system that supports navigation services, travel directions to a destination point or location can be obtained by a search process that uses information stored in the vehicle and/or information received from a navigation service provider through a cellular network, for example. In some instances, a user can specify travel or routing preferences in the navigation service search criteria. A user can specify, for example, a preference for the fastest travel time, for the shortest travel distance, and/or for routes that include highways over routes that include country or rural roads. The navigation service search criteria, however, can be limited by the navigation system and/or by the network that supports the system.

Improvements in mobile or in-vehicle navigation services are desirable to a broad range of users. Thus, a need exists for interactive services and/or devices that use satellite and terrestrial communication systems to offer users wide geographic coverage and a more flexible, effective, and/or feature-rich navigation and guidance experience.

SUMMARY

An apparatus includes a controller to process one or more criterion for selecting a point-of-interest (POI). The criterion can be based on historical trip data. Data related to a POI, including a community-of-interest (COI) rating, for example, can be accessed through a satellite and terrestrial mobile communication network. Multiple POIs can be graphically represented for user selection based on the criterion and/or on other data. Once a POI is selected, data related to the selected POI, including navigation data, can be displayed. In another embodiment, the controller can access navigation data to a specified destination. The navigation data can be based on historical trip data such as route segments and destination areas. The navigation data can be accessed from a mobile or in-vehicle system or through the satellite and terrestrial mobile communication network from a navigation service provider and can be displayed to assist a user in reaching the specified destination.

DETAILED DESCRIPTION

The devices and methods described herein are generally related to mobile or in-vehicle interactive navigation services. For example, the devices and methods are suitable for use in a hybrid satellite and terrestrial (satellite/terrestrial) communication system, such as a Mobile Satellite Services (MSS) system with an Ancillary Terrestrial Component (ATC). An example of such a hybrid satellite/terrestrial communication system is described in U.S. patent application Ser. No. 11/797,048 to Zufall et, al., the disclosure of which is incorporated herein by reference in its entirety. An MSS MSS/ATC system can use one or more satellites to support a wide geographic coverage of mobile satellite interactive services. For example, a portion of the 2 GHz spectrum allocated for MSS satellite communications can be used to provide effective service coverage to rural and remote areas. Along with the MSS network, the land-based ATC network can facilitate service penetration in urban and suburban areas through effective satellite and terrestrial frequency reuse.

The mobile interactive satellite services described herein can be used to provide navigation, guidance, and/or additional information such that a user can travel from a current location to a specified or preferred destination. The destination can be a specified address, the name of a place or location, and/or a destination category, for example. In some instances, the destination can be a point-of-interest (POI), such as a restaurant, store, or entertainment venue, for example, which can be selected from multiple POIs within a specified destination category. The selection of a POI can be based, at least partially, on historical information collected during previously conducted trips, on other navigation information related to the POIs, and/or on a community-of-interest (COI) rating for the POIs, for example. Information related to the multiple POIs can be graphically or visually represented to facilitate the destination selection process. Moreover, navigation, guidance, and/or other information related to a specified or selected destination can be displayed to assist the user in reaching the destination.

It is noted that, as used in this written description and the appended claims, the singular forms "a," "an" and "the" include plural referents unless the context clearly dictates otherwise. Thus, for example, the term "a route segment" is intended to mean a single segment or a combination of segments. Similarly, the term "a destination area" is intended to mean, for example, a single destination area or more than one destination areas.

Figure 1:
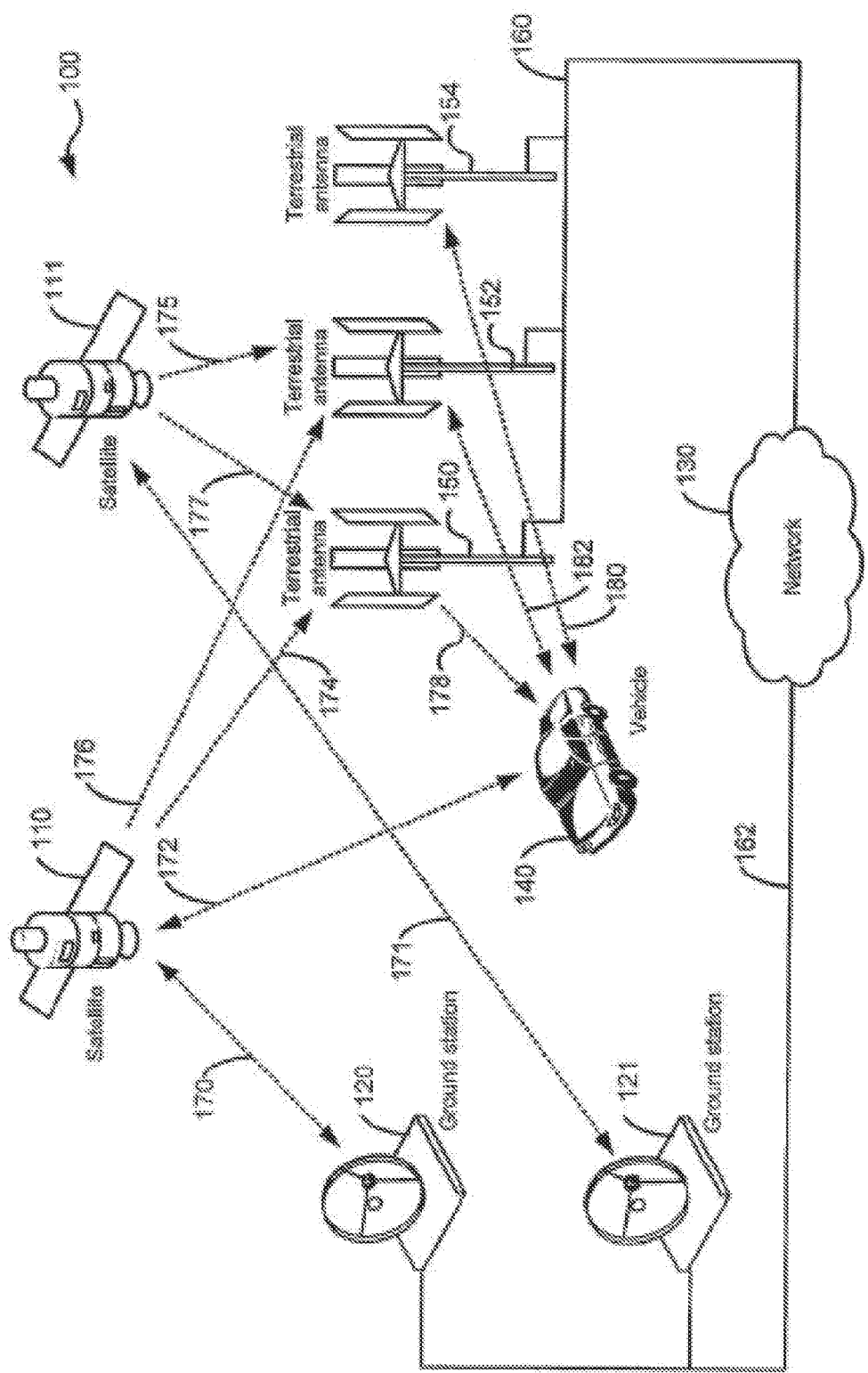
FIG. 1 is a schematic representation of a satellite and terrestrial mobile communication network, according to an embodiment of the invention.

FIG. 1 depicts a schematic representation of a satellite and terrestrial mobile communication network, according to an embodiment of the invention. A hybrid satellite/terrestrial communication network 100 can be configured to provide mobile interactive satellite services, such as interactive navigation services, for example. The hybrid satellite/terrestrial communication network 100 can include a first satellite 110, terrestrial antennas 150, 152, and/or 154, a first ground station 120, and a network 130. In some instances, the hybrid satellite/terrestrial communication network 100 can have a second satellite 111 and/or a second ground station 121 to support other mobile interactive satellite services, such as mobile video services that provide satellite television multicasting, for example.

The first satellite 110 can be configured to communicate with the first ground station 120 through one or more signals in a connection or communication path 170 that includes, for example, uplink signals and downlink signals. The uplink signals can be used to communicate information or data from the first ground station 120 to the first satellite 110. The uplink-communicated information can include a multicast portion or component (e.g., video, music, traffic reports, radio) and/or an interactive component (e.g., navigation data, travel assistance data). The downlink signals can be used to communicate data, such as interactive data (e.g., requests for navigation services, requests for travel assistance services), from the first satellite 110 to the first ground station 120.

The first ground station 120 can be configured to process at least a portion of the data or information related to an interactive service that can be supported by the hybrid satellite/terrestrial communication network 100. In this regard, the first ground station 120 can be configured to process multicast, interactive, and/or control data for communication with the first satellite 110. In one example, the first ground station 120 can generate ground-based beamforming (GBBF) information that is communicated to the first satellite 110 via the communication path 170. The GBBF information can be used to configure a transmission antenna, such as an antenna array, for example, which can be used by the first satellite 110 to generate an appropriate number of beam spots and beam spot locations, and/or appropriate beam spot shapes to effectively communicate with a mobile interactive services system, such as one that can be used in the vehicle 140, and/or with terrestrial antennas 150 and 152. The GBBF information can be dynamically modified to adjust communication operations, including spectrum bandwidth and/or geographic coverage, for example, between the first satellite 110 and users of mobile interactive satellite services. In emergency situations, such as during a natural disaster, for example, GBBF information can be processed in a manner such that priority in spectrum bandwidth and/or geographic coverage can be given to affected areas.

The first satellite 110 can be configured to communicate with a mobile interactive services system through one or more signals in a connection or communication path 172. In the example shown in FIG. 1, the first satellite 110 can communicate with a mobile interactive services system in the vehicle 140. The communication path 172 can include a downlink signals through which the first satellite 110 can wirelessly transmit multicast and/or interactive data to the mobile interactive services system and an uplink signals to wirelessly transmit interactive data from the mobile interactive services system in the vehicle 140 to the first satellite 110. In this regard, a user can request data, such as travel assistance data, data related to a specific destination, and/or data related to a destination or assistance category of interest, for example, through one or more mobile interactive satellite services supported though the uplink signals in the communication path 172. Moreover, a mobile interactive services system can communicate with a service provider (e.g., navigation service provider, travel assistance service provider, a travel assistance service center) through the downlink and uplink signals in the communication path 172.

In some embodiments, the first satellite 110 can be configured to communicate with terrestrial antennas 150 and 152 using one or more signals through communication paths 174 and 176, respectively. For instance, communication paths 174 and 176 can each include a downlink path from the first satellite 110 to the terrestrial antennas 150 and 152, respectively. Each of the downlink paths can support multicast and/or interactive data communication to the terrestrial antenna. In one example, the terrestrial antenna 150 can be configured to further communicate multicast and/or interactive data received from the first satellite 110 to a mobile interactive services system in the vehicle 140 through a downlink path in a communication path 178. In the example shown in FIG. 1, however, terrestrial antenna 150 may not be configured to receive interactive data from the mobile interactive services system in the vehicle 140 (e.g., communication path 178 may not support uplink signals to terrestrial antenna 150). In another example, terrestrial antenna 152 can be configured to further communicate multicast and/or interactive data received from the first satellite 110 to a mobile interactive services system in the vehicle 140 through a downlink path in a communication path 182. Along with the downlink path, communication path 182 can have an uplink path that can support transmission of signals that include interactive data from the mobile interactive services system in the vehicle 140 to the terrestrial antenna 152.

The ground station 120 can be configured to communicate with terrestrial antennas 150, 152, and 154 through a network 130. In this regard, land-based communication of multicast and/or interactive data can occur through terrestrial antennas 150, 152, and 154. In the example shown in FIG. 1, terrestrial antennas 150, 152, and 154 can be configured to communicate multicast and/or interactive data via at least one of communication paths 178, 182, and 180, respectively, with a mobile interactive services system in the vehicle 140. Terrestrial antennas 152 and 154, for example, can be configured for bi-directional communication and can receive interactive data from the mobile interactive services system in the vehicle 140 through uplink paths in communication paths 182 and 180, respectively. Terrestrial antennas 152 and 154 can be configured to communicate interactive data received from the mobile interactive services system in the vehicle 140 to the ground station 120 through the network 130 for processing.

The network 130 can include at least a portion of, for example, a public switched telephone network (PSTN), a packet-switched network, a satellite network, and/or a wireless network. The packet-switched network can be a multi-protocol label switching (MPLS) network that can carry different kinds of traffic such as Internet protocol (IP) packets, asynchronous transfer mode (ATM) frames, synchronous optical network (SONET) frames, and/or Ethernet frames, for example. The ground station 120 can be configured to communicate with the network 130 through a network connection or communication path 162. Terrestrial antennas 150, 152, and 154 can communicate with the network 130 through a network connection or communication path 160. Communication paths 160 and 162 can include, in some instances, a broadband and/or long-haul optical fiber connection.

Other embodiments of the hybrid satellite/terrestrial communication network 100 can include a number of ground stations, terrestrial antennas, and/or satellites that can be different from those of the different embodiments described in FIG. 1. Moreover, other embodiments of the hybrid satellite/terrestrial communication network 100 can support multiple devices that, like the mobile interactive services system in the vehicle 140, can be configured to communicate with the first satellite 110 and with the terrestrial antennas 150, 152, and/or 154. For example, handheld devices, laptops, and/or in-vehicle systems can be configured to receive and/or transmit data related to mobile interactive satellite services through an embodiment of the hybrid satellite/terrestrial communication network 100.

Figure 2:
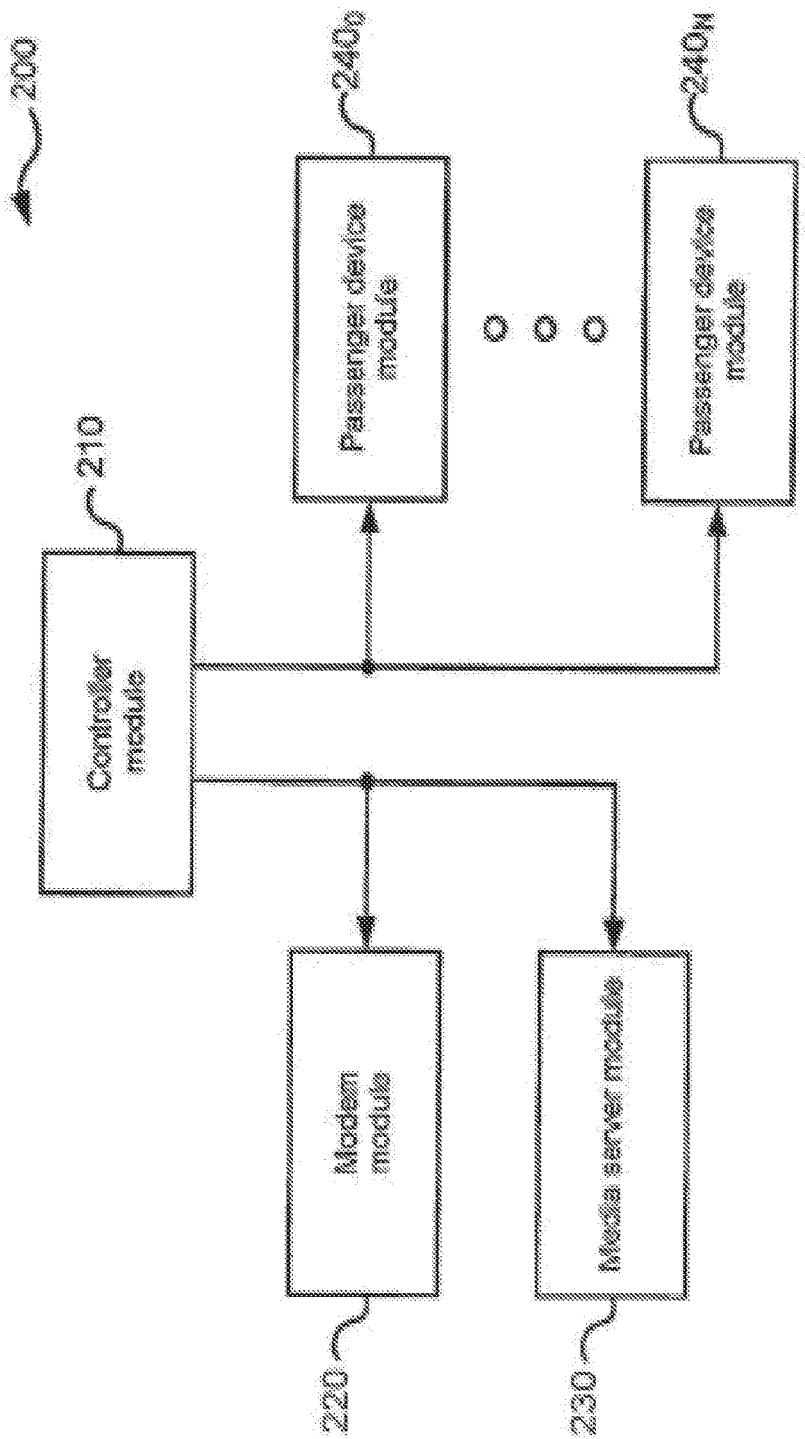
FIGS. 2-3 are block diagrams of a mobile interactive services system for satellite and terrestrial communication, according to embodiments of the invention.
Figure 3:
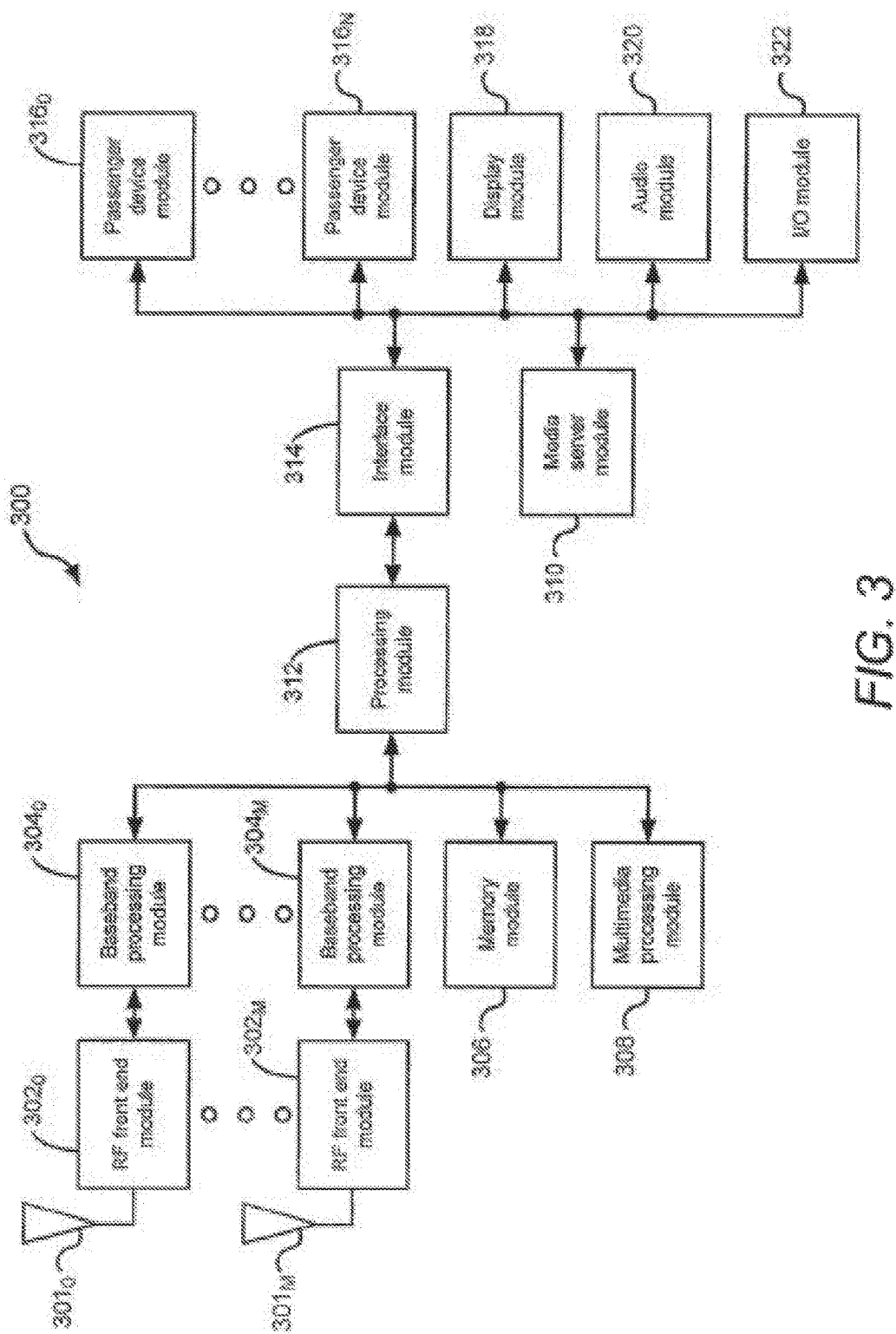

FIGS. 2-3 are block diagrams of a mobile interactive services system for satellite and terrestrial communication, according to embodiments of the invention. FIG. 2 depicts a schematic representation of a mobile interactive services system 200 that can be configured to provide mobile interactive satellite services. In some instances, the mobile interactive services system 200 can be an in-vehicle system (i.e., can operate within and/or coupled to the vehicle, for example). The mobile interactive services system 200 can include a controller module 210, a modem module 220, and/or a media server module 230. In some instances, the mobile interactive services system 200 can include one or more passenger device modules $240_0$, . . . , $240_N$. The controller module 210, the modem module 220, the media server module 230, and the passenger device modules $240_0$, . . . , $240_N$ can be software-based (e.g., set of instructions executable at a processor, software code) and/or hardware-based (e.g., circuit system, processor, application-specific integrated circuit (ASIC), field programmable gate array (FPGA)). In some embodiments, the mobile interactive services system 200 can be configured to communicate with a vehicle communication network, such as, for example, a controller area network (CAN), an on-board diagnostics II (OBD-II), a media-oriented system transport (MOST), or other like vehicle communication networks.

The controller module 210 can be configured to process and/or display data such as data received from other modules or components of the mobile interactive services system 200, data that is provided as input from a user, and/or data received from a vehicle communication network or bus. For instance, the controller module 210 can receive, process, and/or display multicast and/or interactive data that is received via the modem module 220. In some instances, the controller module 210 can receive, process, and/or display data (e.g., video, audio, navigation, and/or travel assistance data) stored in the media server module 230. The data processing provided by the controller module 210 can include processing that supports mobile interactive satellite services such as mobile interactive navigation services, for example. The controller module 210 can be configured to store data before, during, and/or after processing.

In some embodiments, the controller module 210 can be configured to collect and/or process historical trip data from one or more previous trips. In other embodiments, the controller module 210 can process historical trip data for transmission to a service provider or service center that may further process the historical trip data to generate, for example, navigation and/or travel assistance data. The navigation data generated from the processed historical trip data can be subsequently received by the mobile interactive services system 200. Historical trip data can include, for example, departure time and/or location, arrival time and/or location, road or route segments traveled, travel time, travel distance, time of departure, and/or date (day, week, month, and/or year) of travel. In some embodiments, historical trip data can include navigation data or guidance data that may have been received from a navigation service provider for consideration by a user during a previously occurring trip.

An example of historical trip data processing can include determining which trips are routine or regularly occurring trips. In one embodiment, routinely occurring trips can be determined by generating statistical information which may be compared to specified thresholds to determine when a certain trip (e.g., weekday morning commute to work) occurs routinely. A road or route segment traveled during a routine trip can be referred to as a routine route segment and a destination location or destination area arrived to during a routine trip can be referred to as a routine destination location or a routine destination area, respectively, for example. In other embodiments, a user of the mobile interactive services system 200 may indicate to the system that a trip is a routine trip.

The controller module 210 can be configured to communicate data to other components of the mobile interactive services system 200. For example, the controller module 210 can communicate user input data, such as interactive data, to the modem module 220. Moreover, the controller module 210 can be configured to control at least a portion of the operation of other components of the mobile interactive services system 200. The controller module 210 can control, for example, the providing of video, audio, and/or other data to the passenger device modules $240_0, \ldots, 240_N$.

The modem module 220 can be configured to communicate with a network such as the hybrid satellite/terrestrial communication network 100 described in FIG. 1. In this regard, the modem module 220 can support multiple wireless and/or satellite communication or networking protocols, including multiple cellular communication protocols, for example. For mobile video services, for example, the modem module 220 can support one or more satellite communication protocols, such as digital video broadcasting satellite services to handhelds (DVB-SH) or DVB second generation (DVB-S2). The modem module 220 can communicate with cellular networks such as global system for mobile communications (GSM) or code-division multiple access (CDMA) networks, for example. Moreover, the modem module 220 can be configured to support wireless side-loading operations, such as content loading from a local area network (LAN), through multiple wireless interfaces, including WiMax IEEE 802.16 interface and/or WiFi IEEE 802.11 interface, for example.

The media server module 230 can be configured to store multimedia data (e.g., video, audio, navigation, and/or travel assistance data). The multimedia data can be stored in, for example, integrated circuit (IC) memory, compact discs (CDs), digital video discs (DVDs), and other like machine-readable storage medium. In some instances, the media server module 230 can receive multimedia data for storage from the modem module 220. In this regard, the media server module 230 can operate as a digital video recorder (DVR), for example. In a DVR, multimedia data (e.g., current satellite video channel programming) can be received and stored while stored multimedia data (e.g., previously stored satellite video channel programming) can be accessed for further processing. The media server module 230 can communicate stored multimedia data to the controller module 210, which may process and/or display the multimedia data. For instance, the controller module 210 can display video data, audio data, instructional information, travel assistance information, navigation maps, guidance information, travel directions, information related to specified destinations and/or destinations within destination categories, personal and/or community ratings of places, and/or other information that may be stored in the media server module 230. Moreover, the controller module 210 may communicate at least a portion of the multimedia data received from the media server module 230 to one or more of the passenger device modules $240_0, \ldots, 240_N$ for display.

The passenger device modules $240_0, \ldots, 240_N$ can be configured to process and/or display data received from the controller module 210. For example the passenger device modules $240_0, \ldots, 240_N$ can be configured to play movies, music, radio programming, video games, and/or other applications. The controller module 210 can be used to select which application is provided in each of the passenger device modules. In this regard, the passenger device modules $240_0, \ldots, 240_N$ can be configured such that each can provide the same application (e.g., multiple users can play a single video game) or different applications (e.g., different movies in each module).

Other embodiments of the mobile interactive services system 200 can include architectural organizations, such as data and/or control bus architectures, for example, different from those of the different embodiments described in FIG. 2. In other embodiments, more than one of the modules described in FIG. 2 can be combined into a single module. One or more of the functionalities or operations provided by different modules described in FIG. 2 can be shared between different modules and/or can be combined such that a single module provides the functionality or operation. Other embodiments of the mobile interactive services system 200 can include one or more modules that can support additional mobile interactive satellite services.

FIG. 3 depicts a schematic representation of a mobile interactive services system 300 that can be configured to provide mobile interactive satellite services such as mobile interactive navigation services and/or mobile interactive travel assistance services, for example. The mobile interactive services system 300 can include one or more radio frequency (RF) front-end modules $302_0, \ldots, 302_M$, one or more baseband processing modules $304_0, \ldots, 304_M$, a memory module 306, a multimedia processing module 308, a processing module 312, an interface module 314, a media server module 310, a display module 318, an audio module 320, and/or an input/output (I/O) module 322. In some embodiments, the mobile interactive services system 300 can include one or more passenger device modules $316_0, \ldots, 316_N$. The media server module 310 and the passenger device modules $316_0, \ldots, 316_N$ in FIG. 3 can have, respectively, substantially similar functionality as that of the media server module 230 and of the passenger device modules $240_0, \ldots, 240_N$ described in FIG. 2.

The RF front-end modules $302_0, \ldots, 302_M$ can be coupled to one or more antennas, such as the antennas $301_0, \ldots, 301_M$, for example, for transmission and/or reception of RF signals. The mobile interactive services system 300 can communicate with a hybrid satellite/terrestrial communication network through the RF front-end modules $302_0, \ldots, 302_M$ via the antennas $301_0, \ldots, 301_M$. Each of the antennas $301_0, \ldots, 301_M$ can be a single antenna or multiple antennas, such as antenna arrays, for example. In some instances, the mobile interactive services system 300 can support multiple-input multiple-output (MIMO) operations, and other like operations that use antenna diversity or smart antenna technology.

The modules or components of the mobile interactive services system 300 can be software-based (e.g., set of instructions executable at a processor, software code) and/or hardware-based (e.g., circuit system, processor, application-specific integrated circuit (ASIC), field programmable gate array (FPGA)). The RF front-end modules $302_0, \ldots, 302_M$, for example, can be configured to process RF signals. In this regard, an RF front-end module can operate as a transmitter (i.e., processes signals for wireless transmission) and/or as a receiver (i.e., processes wirelessly-received signals). An RF front-end module can be configured to perform multiple signal processing operations, including, but not limited to, amplification, filtering, analog-to-digital conversion (ADC), de-modulation, modulation, digital-to-analog conversion (DAC), and/or mixing, for example. Thus, an RF front-end module can convert received RF signals to an appropriate baseband frequency for further processing and/or convert baseband frequency signals to appropriate RF signals for wireless transmission. An RF front-end module can process signals according to one or more terrestrial (e.g., land-based) and/or satellite RF communication protocols.

The baseband processing modules $304_0, \ldots, 304_M$ can be configured to perform digital signal processing operations on data received from an RF front-end module, from the processing module 312, and/or from the memory module 306, for example. A baseband processing module can communicate processed data to an RF front-end module for wireless transmission or to another module of the mobile interactive services system 300 for further processing. In one example, video content from a video interactive service can be received and processed by a baseband processing module and can be communicated to the multimedia processing module 308 for further processing. In another example, navigation or navigation-related data can be received and processed by a baseband processing module and can be communicated to the processing module 312 for further processing and/or to the memory module 306 for storage. A baseband processing module can process data according to one or more terrestrial and/or satellite RF communication protocols. Moreover, a baseband processing module can provide feedback information to an RF front-end module based on information that results from processing data.

The memory module 306 can include a machine-readable storage medium, such as an IC memory, for example, that can be configured to store data used by the mobile interactive services system 300. In some instances, the stored data can include data related to one or more mobile interactive satellite services such as navigation services and/or travel assistance services. For example, the memory module 306 can store navigation and/or navigation-related data that can include, without limitation, historical trip data, current trip data, navigation data provided by a service provider that is related to a previously conducted trip, navigation data related to a selected point-of-interest (POI), and/or data related to multiple POIs for a specified destination category. The memory module 306 can be configured to store other types of data including, without limitation, data related to terrestrial and/or satellite communication protocols, data related to terrestrial and/or satellite communication activity, video data, audio data, and/or application data. The memory module 306 can store data received from and/or to be communicated to a hybrid satellite/terrestrial communication network through the RF front-end modules $302_0, \ldots, 302_M$.

The multimedia processing module 308 can be configured to digitally process multimedia data (e.g., video, audio, and/or content data). For example, video data can be decoded and/or encoded at the multimedia processing module 308 according to the appropriate video coding standard. In this regard, the multimedia processing module 308 can be configured to support more than one video, audio, and/or content data coding standard, such as the H.264 standard and the MPEG-4 standard for video coding, for example. In some instances, the processing module 312 can provide at least a portion of the multimedia data processing operations supported by the mobile interactive services system 300. For example, the multimedia processing module 308 can be optimized for video data processing operations and the processing module 312 can be used to provide audio and/or content data processing operations.

The processing module 312 can be configured to provide operations for mobile interactive satellite services, including mobile interactive navigation services and/or mobile interactive travel assistance services. For example, along with providing control operations for the mobile interactive services system 300, the processing module 312 can provide mobile interactive navigation services operations that include, but are not limited to, operations related to the processing, storing, displaying, organizing, selecting, and/or inputting of user data. In this regard, the processing module 312 can receive data from a hybrid satellite/terrestrial communication network through the RF front-end modules $302_0, \ldots, 302_M$ and the baseband processing modules $304_0, \ldots, 304_M$. Moreover, the processing module 312 can receive data from the memory module 306, the multimedia processing module 308, the display module 318, media server module 310, the audio module 320, the I/O module 322, and/or the passenger device modules $316_0, \ldots, 316_N$.

The interface module 314 can be configured to communicate data between multiple modules and the processing module 312. In some embodiments, the interface module 314 can support multiple interface busses, protocols, and/or standards, such as the inter-integrated circuit (I.sup.2C) bus, the integrated inter-chip sound (I.sup.2S) bus, the serial-peripheral interface (SPI) bus, and/or the universal serial bus (USB), for example. In this regard, the interface module 314 can use different bus protocols to communicate, for example, audio, video, content, and/or graphical data between the processing module 312 and one or more modules. For example, in mobile interactive navigation services, a controller module, such as the controller 210 in FIG. 2, can include the display module 318, the audio module 320, and/or the I/O module 322 for providing a user interface (UI) to receive and/or provide navigation data. The display module 318 can communicate with the interface module 314 through one interface protocol and the audio module 320 through a different interface protocol. Moreover, the I/O module 322 can communicate user selection data, such as touch-screen data input or button data input, for example, using yet a different interface protocol.

Other embodiments of the mobile interactive services system 300 can include architectural organizations, such as data and/or control bus architectures, for example, different from those of the different embodiments described in FIG. 3. In other embodiments, more than one of the modules described in FIG. 3 can be combined into a single module. One or more of the functionalities or operations provided by different modules described in FIG. 3 can be shared between different modules and/or can be combined such that a single module provides the functionality or operation. Other embodiments of the mobile interactive services system 300 can include one or more modules that can support additional mobile interactive satellite services.

Figure 4B:
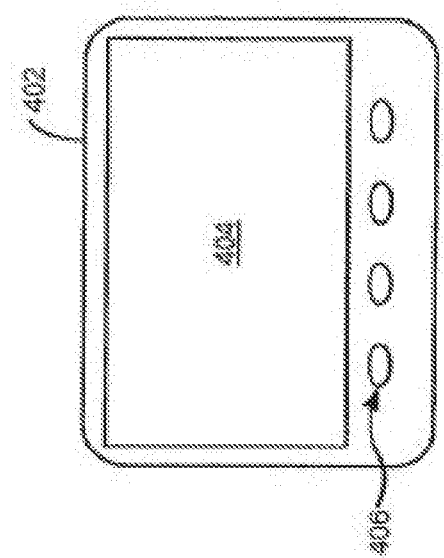
FIGS. 4A-4B are front views of controllers and passenger devices for use with a hybrid satellite and terrestrial communication network, according to embodiments of the invention.
Figure 4A:
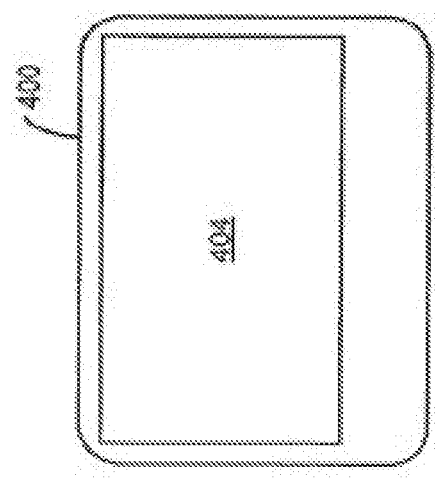

FIGS. 4A-4B are front views of controllers and passenger devices for use with a hybrid satellite and terrestrial communication network, according to embodiments of the invention. FIG. 4A shows a front view of a module 400, which can be a controller module or a passenger device module as described in FIGS. 2 and 3, for example. The module 400 can include a display screen 404 that can be configured to graphically represent or display data, including data related to mobile interactive satellite services such as navigation services and/or travel assistance services, for example. In some embodiments, the display screen 404 can be a touch-screen display, for example, which can be used to enter data, such as alphanumeric data and/or selection data. The data entered through a touch-screen display can be subsequently processed by a mobile interactive services system to provide appropriate operations for mobile interactive satellite services. In some instances, certain operations and/or selections can be activated by touching an icon or other graphical or visual representation displayed on the screen. In other instances, certain operations and/or selections can be activated by gesturing and/or writing on the touch-screen display.

FIG. 4B depicts a front view of a module 402 that can include the display screen 404. Along with the display screen 404, the module 402 can include one or more controls 406 (e.g., buttons) that can be used to enter data, such as alphanumeric data and/or selection data. For example, one or more of the controls 406 can be used as soft buttons that provide a different set of selection options. In another example, one or more of the controls 406 can be used as hard buttons that provide a fixed set of selection options, such as setting the module to an ON or OFF state. The controllers or passenger devices described in FIGS. 4A-4B can detect selections made by a user through the user interface provided by the display screen 404 and/or the controls 406.

The modules 400 and 402 can include audio and/or visual components (not shown) that can be used to input and/or output data. In one example, a speaker (not shown) can be included to provide a user with audio navigation instructions or with audio travel assistance instructions. In another example, a microphone (not shown) can be used to provide a mobile interactive services system with spoken selections or spoken input data, such as speaking a POI destination category or speaking a destination address. In yet another example, a camera (not shown) can be included to detect user motions, gestures, and/or signals that can correspond to a data entry operation.

As described above, controllers in a mobile interactive services system can be used to provide a user interface for mobile interactive satellite services that can be supported through a network such as the hybrid satellite/terrestrial communication network 100. Navigation services, for example, can use the interactive aspect of the hybrid satellite/terrestrial communication network 100 to offer users a wide geographic coverage and a more flexible, effective, and/or feature-rich navigation and guidance experience.

Figure 5:
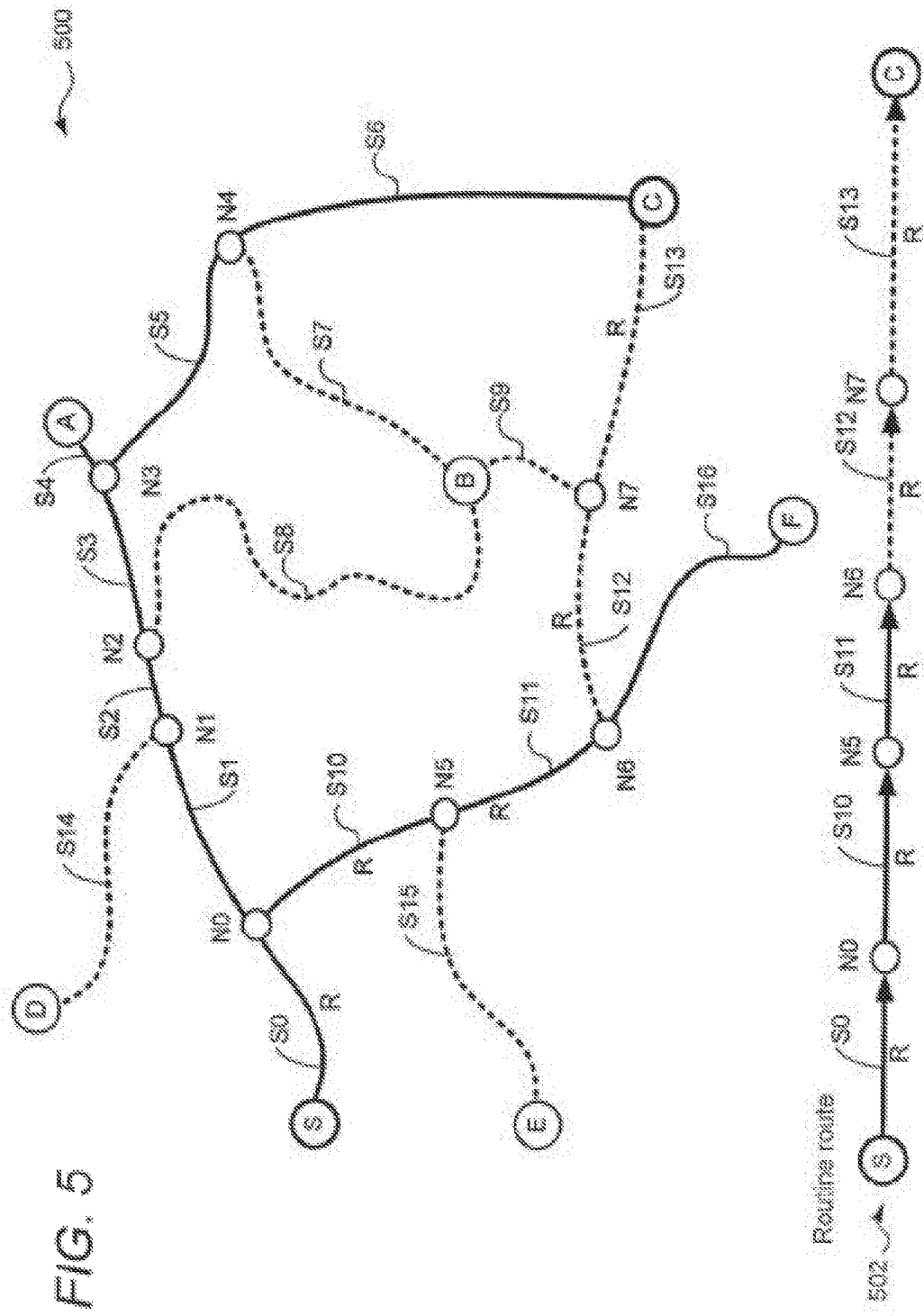
FIG. 5 is a schematic representation of a navigation map including routine trip data, according to an embodiment of the invention.

FIG. 5 is a schematic representation of a navigation map, including routine trip data, according to an embodiment of the invention. As shown in FIG. 5, a navigation map 500 can be a graphical representation of a geographic area or region that includes information regarding multiple locations (e.g., towns, cities, places, landmarks, addresses) and/or road information (e.g., road identification, road lanes, exit identification, road intersections and junctions, speed limits). The geographic region in the navigation map 500 can correspond to a region for which mobile interactive satellite services can be provided. In this regard, the navigation map 500 can include information that can be used by a mobile interactive navigation service to determine and/or provide navigation instructions and/or other navigation-related data.

In the example shown in FIG. 5, the navigation map 500 can include multiple locations S, A, B, C, D, E, and F, multiple road or route segments, and/or multiple road or route nodes. A route segment can refer to a road or to a portion of a road between two route nodes, for example. As shown, a solid-line route segment can be associated with a large road, such as a highway, for example, and a dotted-line route segment can be associated with a local road, such as a back road or a rural road, for example. In this regard, a solid-line route segment can generally correspond to a route segment in which a driver can travel at a faster speed than when traveling through a dotted-line route segment. For example, local roads tend to have fewer lanes of traffic and have more traffic lights, both of which may tend to reduce the average travel speed. A route node can refer to an intersection or junction between two or more route segments, for example. In some instances (not shown), a route node can also refer to a location or landmark in a route segment that need not be associated with a road intersection or junction.

Within the geographic area described by the navigation map 500, multiple different trips can occur. For example, for a trip between location S and location A, route segments S0, S1, S2, S3, and S4 and nodes N0, N1, N2, and N3 maybe traversed. In another example, for a trip between location S and location B, route segments S0, S1, S2, and S8 and nodes N0, N1, and N2 may be traversed. Traveling between location S and location C, for example, may involve traversing route segments S0, S10, S11, S12, and S13 and nodes N0, N5, N6, and N7. In yet another example, traveling between location A and location F may involve traversing route segments S4, S5, S6, S13, S12, and S16 and nodes N3, N4, location C, N7, and N6.

In some instances, there may be more than one possible route for a trip that involves going from a first location to a second location. For example, a first route for a trip starting at location S and having as destination location B can include traversing route segments S0, S1, S2, and S8 and nodes N0, N1, and N2. A second route for a trip starting at location S and having as destination location B can include traversing route segments S0, S10, S11, S12, and S9 and nodes N0, N5, N6, and N7, for example. The first and second routes can differ in multiple aspects, including total travel distance, travel time, average travel speed, route segments and/or nodes traversed, travel areas or neighborhoods, ease or comfort in traveling (e.g., highway traffic or local road traffic), and/or costs (e.g., tolls), for example.

Differences in routes for a particular trip can result in a user of a mobile interactive services system (e.g., a driver or vehicle passenger) having a preference for one route over another route. In this regard, the user may routinely or regularly prefer to travel using a particular route for trips between specified locations. An example of a regularly occurring trip can be going from the user's home to their place of work at the beginning of a work day. Another example of a regularly occurring trip can be the return trip home at the end of the work day. In this regard, the user or driver can have a preference for one of multiple possible routes that may be available when traveling to and from work, for example.

A regularly occurring trip can be referred to as a routine trip and the route segments traversed during the routine trip can be referred to as routine route segments, for example. As described above, a mobile interactive navigation system can be used to collect historical trip data which can be processed to determine whether a trip occurs with a sufficient degree of regularity to be a routine trip. Historical trip information that can be processed to determine whether a trip is a routine trip can include, but need not be limited to, starting and destination locations, departure time, arrival time, and/or day of travel (e.g., Monday, weekday, weekend). In some instances, the mobile interactive navigation system can process the historical trip data while in other instances the historical trip data can be communicated to a provider of navigation and/or travel assistance services for processing. In the example shown in FIG. 5, a routine trip 502 can include traveling from a location S to a destination at location C. The routine trip 502 can include a route that traverses route segments S0, S10, S11, S12, and S12 and nodes N0, N5, N6, and N7. In this example, an "R" can be used to label routine route segments associated with the routine trip 502.

In some instances, a user may prefer to use routine route segments when making a trip that is different from the routine trip 502. In the example shown in FIG. 5, to travel from location S to a destination at location B, a user can select between, for example, a first route that includes traversing route segments S0, S1, S2, and S8 and route nodes N0, N1, and N2, and a second route that includes traversing route segments S0, S10, S11, S12, and S9 and route nodes N0, N5, N6, and N7. In this instance, the user or driver may prefer the second route over the first route because it includes routine route segments S0, S10, S11, and S12 with which the user may be more comfortable and/or familiar, for example.

Routine route segments can be temporally defined, that is, can be associated with a specific time of day and with specific days. In some instances, a route segment can be a routine route segment for a first trip but may not be a routine route segment for a second trip because of the time and/or day in which the second trip is occurring.

Figure 6A:
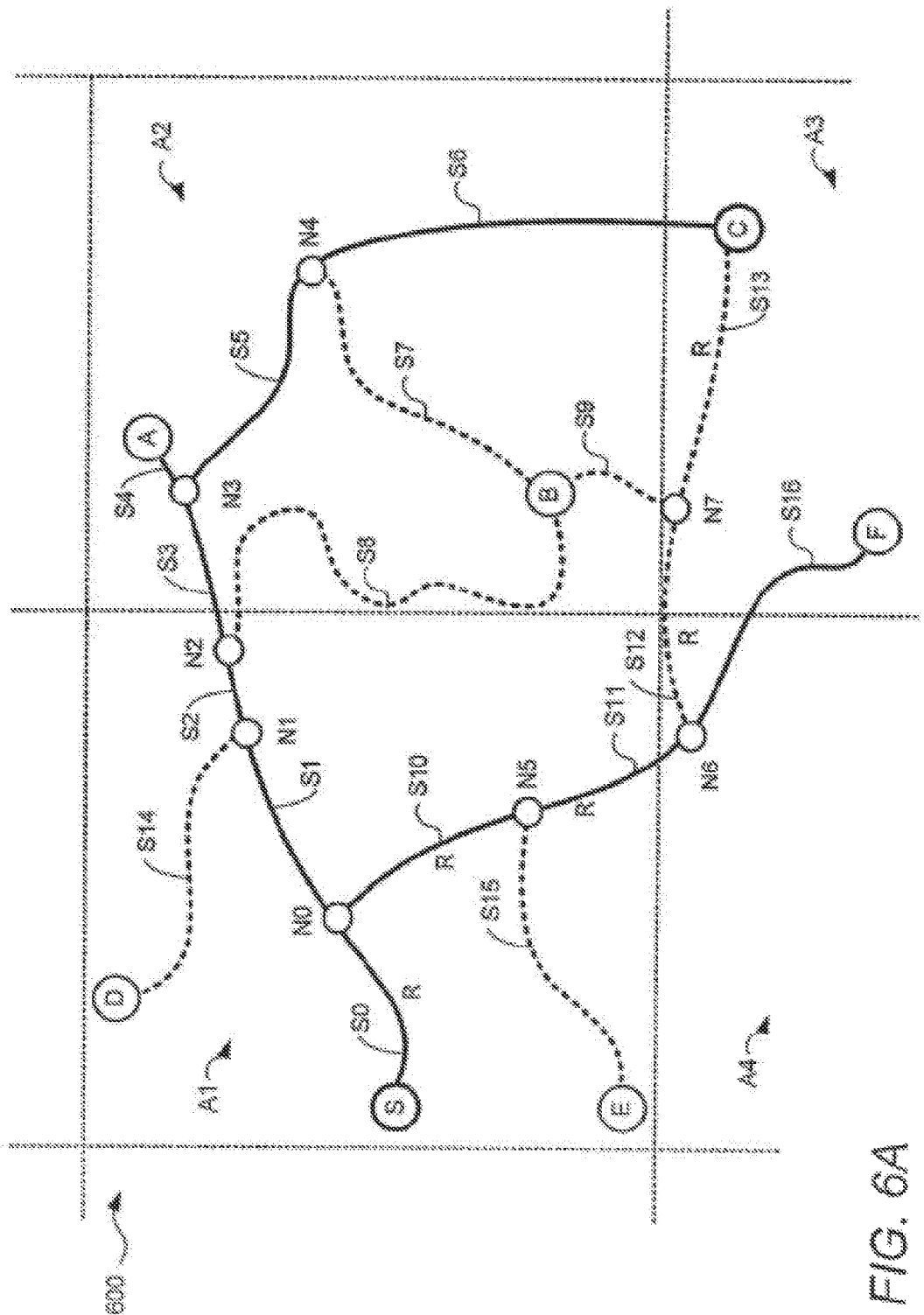
FIG. 6A is a schematic representation of a navigation map including defined areas, according to an embodiment of the invention.

FIG. 6A is a schematic representation of a navigation map including defined areas, according to an embodiment of the invention. FIG. 6A depicts a navigation map 600 that includes the location information and road information described in FIG. 5. Also shown are multiple areas A1, A2, A3, and A4. The areas A1, A2, A3, and A4 can each have a specified or defined geographic area, however, they need not have similar areas, shapes, contours, and/or outlines. In other embodiments, the areas can have different areas, shapes, contours, and/or outlines from those described in FIG. 6A. Moreover, other embodiments can include a different number of areas than the number used in the example in FIG. 6A. Each of the locations S, A, B, C, D, E, and F can be located within one of the areas A1, A2, A3, and A4, for example. For example, locations S, D, and E can be located within area A1. In another example, locations C and F can be located within area A3. In some instances, such as when a location is at a boundary or interface between areas, the location may be included within more than one of the areas A1, A2, A3, and A4.

A starting area can refer to an area or region in which the starting point of a trip is located, for example. Similarly, a destination area can refer to an area or region in which the destination of a trip is located, for example. For instance, when traveling from location S to location A, a user of a mobile interactive services system can start at location A in area A1 and can arrive at location S in area A2. In this example, area A1 is the starting area and area A2 is the destination area. When traveling between any two locations in the navigation map 600 in FIG. 6A, a user or driver may travel from one area to another area or may travel within one of the areas (i.e., the starting and destination areas can be the same).

A user of a mobile interactive services system may routinely or regularly prefer to travel to a specific destination area. For example, the user's place of work, preferred supermarket, and preferred shopping mall may all be located in area A3. A regularly occurring destination area can be referred to as a routine destination area, for example. As described above, a mobile interactive navigation system can be used to collect historical trip data which can be processed to determine whether a particular destination area occurs with a sufficient degree of regularity to be a routine destination area.

Destination areas can be temporally defined, that is, can be associated with a specific time of day and with specific days. In some instances, a destination area can be a routine destination area for a first trip but may not be a routine destination area for a second trip because of the time and/or day in which the second trip is occurring.

Figure 6B:
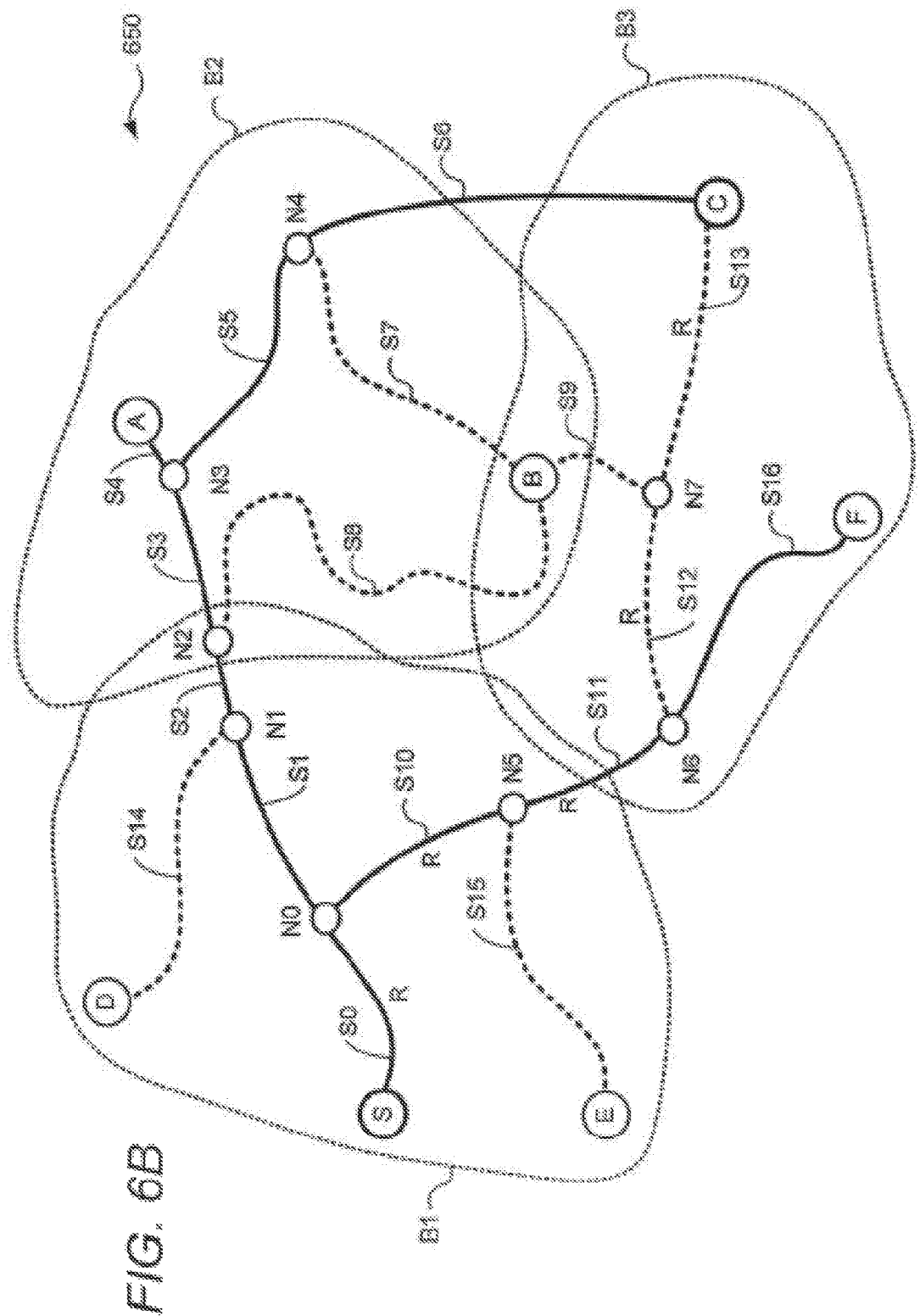
FIG. 6B is a schematic representation of a navigation map including dynamic areas, according to an embodiment of the invention.

FIG. 6B is a schematic representation of a navigation map including dynamic destination areas, according to an embodiment of the invention. FIG. 6B depicts a navigation map 650 that includes the location information and road information described in FIGS. 5 and 6A. Also shown are multiple areas B1, B2, and B3, which can each be dynamically specified or defined based on, for example, historical trip data. For instance, the area, contour, shape, and/or size of each of the areas B1, B2, and B3 can be adjusted or modified based on statistical information that can result from the processing of historical trip data. Areas B1, B2, and B3 can, in some instances, overlap such that a location in the navigation map 650 can be included in more than one of areas B1, B2, and B3. Moreover, as areas B1, B2, and B3 can dynamically change, whether a location is included within a specified area can vary over time.

For example, the home of a user of a mobile interactive services system can be in location S and the user may take short trips, such as for local grocery shopping, for example, to locations D and E. Thus, the geographic scope of area B1 may be at least partially determined from historical trip data collected from trips between the user's home and local shopping in locations D and E. Changes in the user's local shopping habits can result in changes to area B1. In another example, the user's place of work can be in location C. The user may generally stop at locations B and F (e.g., gas station, coffee shop) when traveling to and/or from work. Thus, the geographic scope of area B3 may be determined at least partially from historical trip data collected from trips to and/or from work. Changes in the user's travel habits to work (e.g., dropping off and/or picking up a child at daycare near location A) can result in changes to area B1.

As described above, a user of a mobile interactive services system may routinely or regularly prefer to travel to a specific destination area. For example, area B3 can be a routine destination area when the user travels to area B3 as a destination area with a sufficient degree of regularity. In this regard, the user can have a preference for route segments located within a routine destination area when making a trip. For example, when traveling from location S in area B1 to location B in areas B2 and B3, the user can select between, for example, a first route that includes route segments S0, S1, S2, and S8 and route nodes N0, N1, and N2, and a second route that includes route segments S0, S10, S11, S12, and S9 and route nodes N0, N5, N6, and N7. In this instance, the user can have a preference for the second route because it includes more route segments (e.g., S11, S12, and S9) associated with routine destination area B3 than the first route (e.g., S8).

Figure 7:
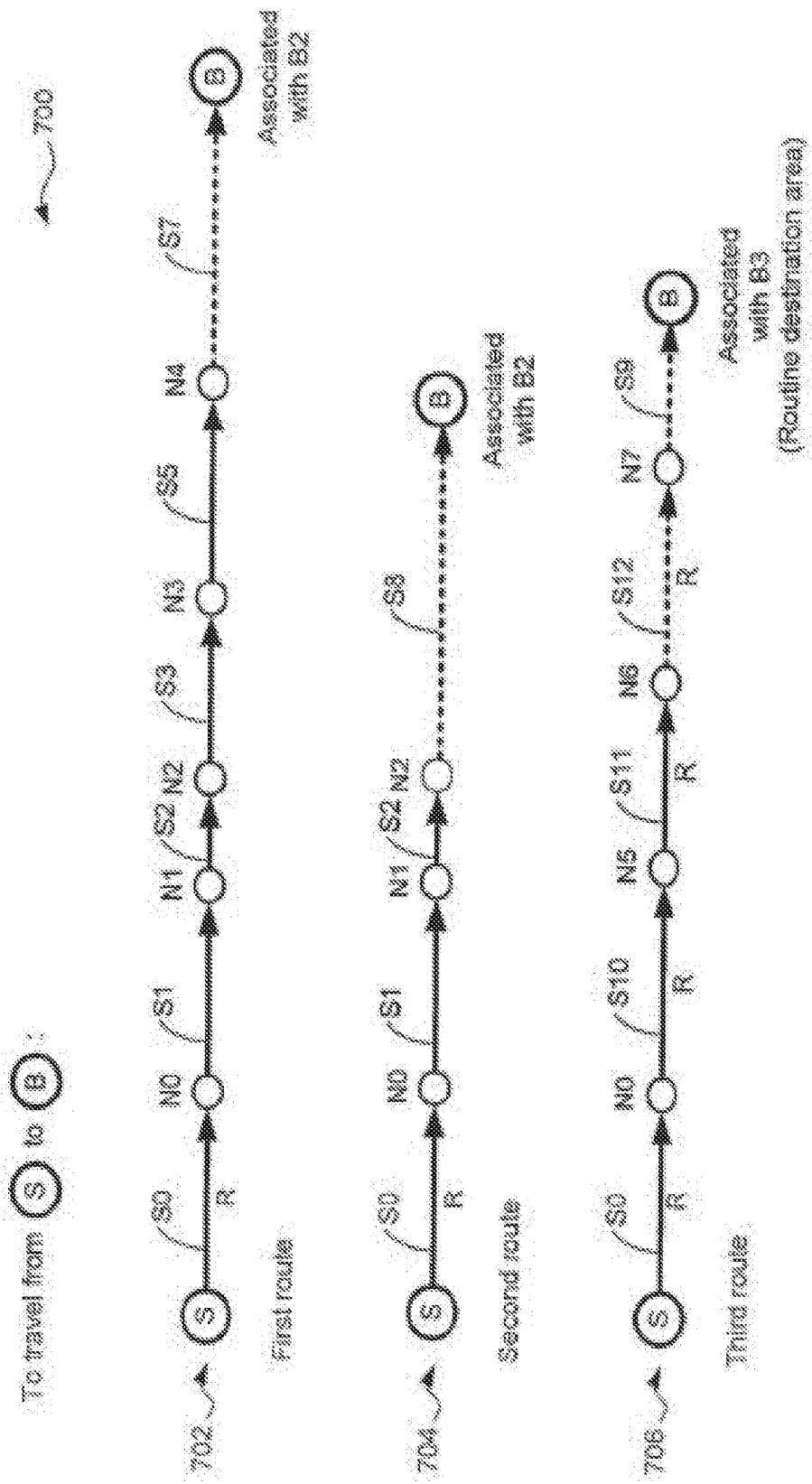
FIG. 7 is a schematic representation illustrating the selection of navigation data based on historical trip data, according to an embodiment of the invention.

FIG. 7 is a schematic representation illustrating the selection of navigation data based on historical trip data, according to an embodiment of the invention. Shown in FIG. 7 is a travel diagram 700 that includes information related to multiple travel or navigation routes, one of which can be selected for a trip between locations S and B as described in FIG. 6B. In some embodiments, a mobile interactive services system, such as the mobile interactive services systems 200 and 300 in FIGS. 2 and 3, respectively, can be used to collect, process, operate, display, and/or select data such as the navigation data illustrated in FIG. 7. The travel diagram 700 can have data that is based on collected and/or processed historical trip data, including route segment information (e.g. routine route segments) and/or travel area information (e.g., routine destination area). In some embodiments, at least a portion the navigation data shown in FIG. 7 can be received from a service provider (e.g., a navigation service provider) through a hybrid satellite/terrestrial mobile communication network.

The example illustrated by the travel diagram 700 includes a first route 702, a second route 704, and a third route 706. Other examples can illustrate travel routes for a trip between locations S and B that are different from those shown in FIG. 7. The first route 702 can correspond to, for example, a route resulting in the least amount of travel time. Because most of the route segments in the first route 702 are larger roads (solid lines), travel time for the first route 702 may be the fastest. The first route 702 can include route segments S0, S1, S2, S3, S5, and S7, of which only route segment S0 is a routine route segment (R). The destination, location B, can be associated with areas B2 and B3 because it is located in an overlap region between areas B2 and B3. For the first route 702, location B is approached using route segment S7 in area B2, thus location B is associated with area B2 and not with area B3.

The second route 704 can correspond to, for example, a travel route resulting in the shortest travel distance. The second route 704 can include route segments S0, S1, S2, and S8, of which only route segment S0 is a routine route segment (R). For the second route 704, location B is approached using route segment S8 in area B2, thus location B is associated with area B2 and not with area B3.

The third route 706 can correspond to, for example, a travel route that can include multiple routine route segments (R). The third route 706 can include route segments S0, S10, S11, S12, and S9, of which only route segment S9 is not a routine route segment (R). For the third route 706, location B is approached using route segment S9 in area B3, thus location B is associated with area B3, which is a routine destination area, and not with area B2.

In the example illustrated by the travel diagram 700, a user of a mobile interactive services system can have a preference for, for example, the fastest travel route, the shortest travel route distance, the travel route with the most routine route segments, the travel route to a routine destination area, and/or a combination of the above. Based on these preferences, the user may select the navigation data of one of the travel routes in the travel diagram 700. For example, the user can prefer the third route 706 because it includes a large number of routine route segments and because location B is associated with a routine destination area. Routine route segments and routine destination areas may give the user a level of comfort, ease, and/or familiarity from previous experiences (e.g., previous trips) that can overcome, in some instances, the benefits of faster travel time and shorter travel distance provided by the first route 702 and the second route 704, respectively.

A user's preferences can be included in the navigation data that is provided by a navigation service through a mobile interactive services system. In some embodiments, the mobile interactive services system can process the user's preferences to generate at least a portion of the navigation data illustrated by the travel diagram 700. In other embodiments, a navigation service provider can process the user's preferences and communicate navigation data that is based on these preferences to the mobile interactive services system through a hybrid satellite/terrestrial communication network.

The processing of a user's preferences can include providing a weight, ranking, and/or priority to multiple aspects of a trip such as, but need not limited to, travel time, travel distance, starting and/or destination location, destination area information, route segment information, traffic conditions, time of day, and/or day of travel. The weighted aspects of the trip can be combined to determine at least one criterion that can be used to select one of the multiple travel routes that are possible for a particular trip. In one example, the combination can be a linear combination while in another example the combination can be non-linear. In one embodiment, the criterion or criteria can be used to graphically represent a relative preference between multiple travel routes such that the user can select one of the travel routes. In another embodiment, the criterion or criteria can be used by a navigation service operated through a mobile interactive services system to determine a preferred travel route. The navigation data of the preferred travel route can be made available (e.g., graphically represented or displayed on a display screen) to the user through a mobile interactive services system. In some embodiments, routine route segments and/or routine destination areas may be given significant weight when determining the criterion or criteria from which to select a travel route.

In some instances, the user's travel preferences, including routine route segments and/or routine destination areas, for example, can be used to adjust or modify navigation instructions or data provided by a navigation service provider. For example, the mobile interactive services system can replace a portion of a travel route provided by a navigation service provider with one or more routine route segments.

Figure 8:
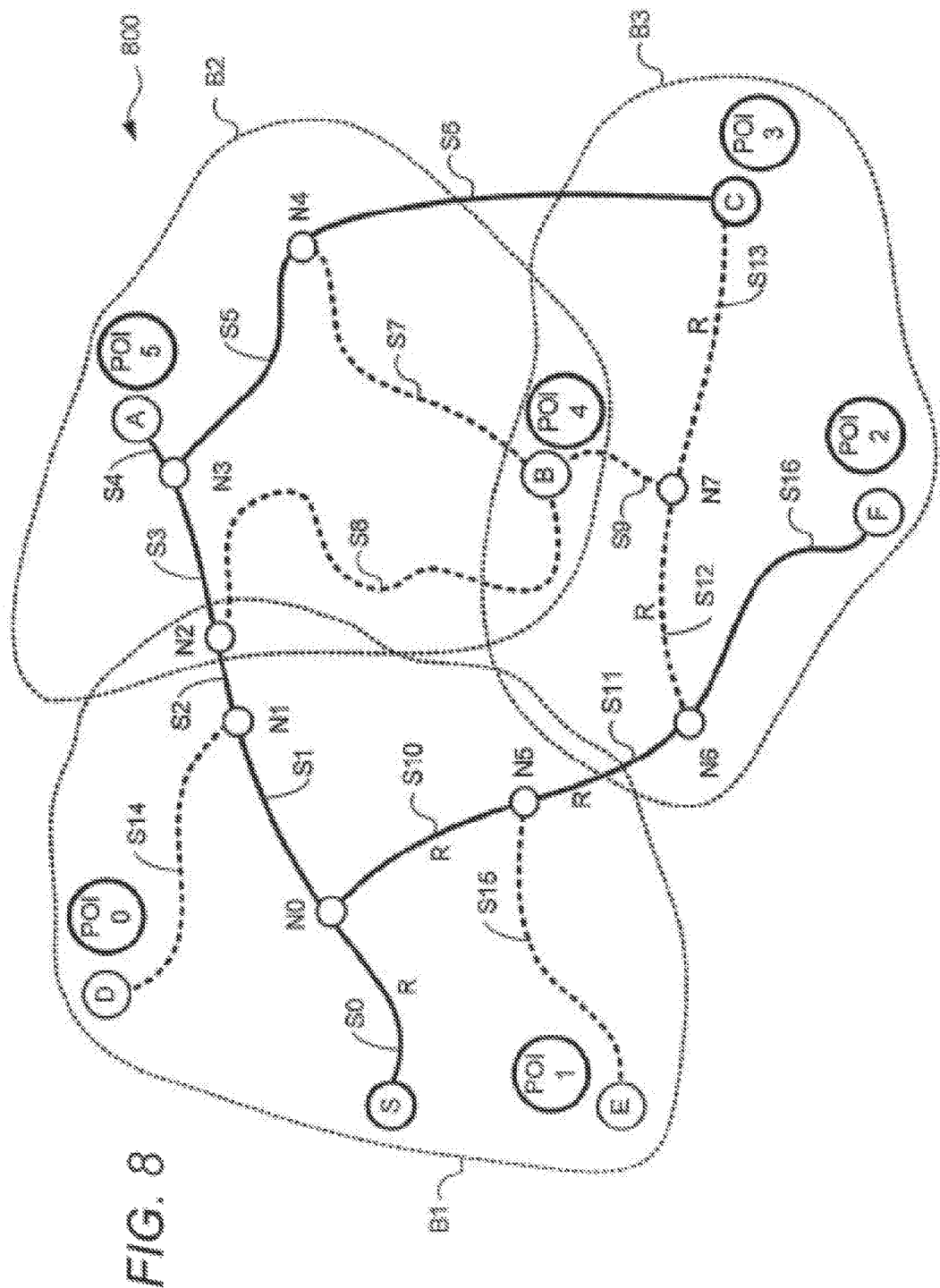
FIG. 8 is a schematic representation of a navigation map including points-of-interest, according to an embodiment of the invention.

FIG. 8 is a schematic representation of a navigation map including points-of-interest, according to an embodiment of the invention. FIG. 8 depicts a navigation map 800 that includes the location information, road information, and area information described in FIG. 6B. Also shown are multiple points-of-interest (POI), including POI 0, POI 1, POI 2, POI 3, POI 4, and POI 5. For instance, POI 0 is located in area B1 near location D, POI 1 is located in area B1 near location E, POI 2 is located in area B3 near location F, POI 3 is located in area B3 near location C, POI 4 is located in areas B2 and B3 near location B, and POI 5 is located in area B2 near location A.

Each POI may correspond to, for example, a destination location from one or more destination categories selected by a user through a mobile interactive services system. For example, a driver can search for navigation or guidance data to a destination category such as entertainment places (e.g., restaurants, cinemas, theaters). The driver can be provided by a navigation service and through the mobile interactive services system with one or more POIs that may meet the search criteria. The navigation or travel route preferences of the user mobile interactive services system can be used to determine at least one criterion for traveling to each POI that provides a relative preference between multiple POIs. For example, the user may prefer traveling to a POI that is near a location which may result in the shortest travel time from a current location, traveling to a POI near a location which may result in using multiple routine route segments (R), traveling to a POI near a location in a routine destination area, and/or a combination of the above.

In some instances, the POI data can include ratings, reviews, and/or rankings that can be provided by a community with similar inters tests to those of the user (e.g., a community-of-interest (COI)). The travel criterion or criteria can, in these instances, include information related to the COI rating. For example, when two or more POIs meet relatively similar travel preferences, the POI with the highest rating by a COI can be preferred over the others.

In one embodiment, at least a portion of the data related to the POIs (e.g., travel route preferences, navigation data, name of place, location) can be graphically represented in the mobile interactive services system to assist the user in the selection process. In this regard, data related to the POIs can be graphically represented to indicate a relative preference between multiple POIs based on, for example, one or more travel criterion. In another embodiment, the travel criterion or criteria results can be used by a navigation service operated through a mobile interactive services system to determine a preferred POIs for the destination category. The navigation data of the preferred POI can be made available (e.g., graphically represented or displayed on a display screen) to the user through a mobile interactive services system. The mobile interactive services system can also make available data related to the remaining POIs upon user request. When a POI is selected or accepted by the user, the mobile interactive services system can provide data related to the POI, including navigation data.

Figure 9A:
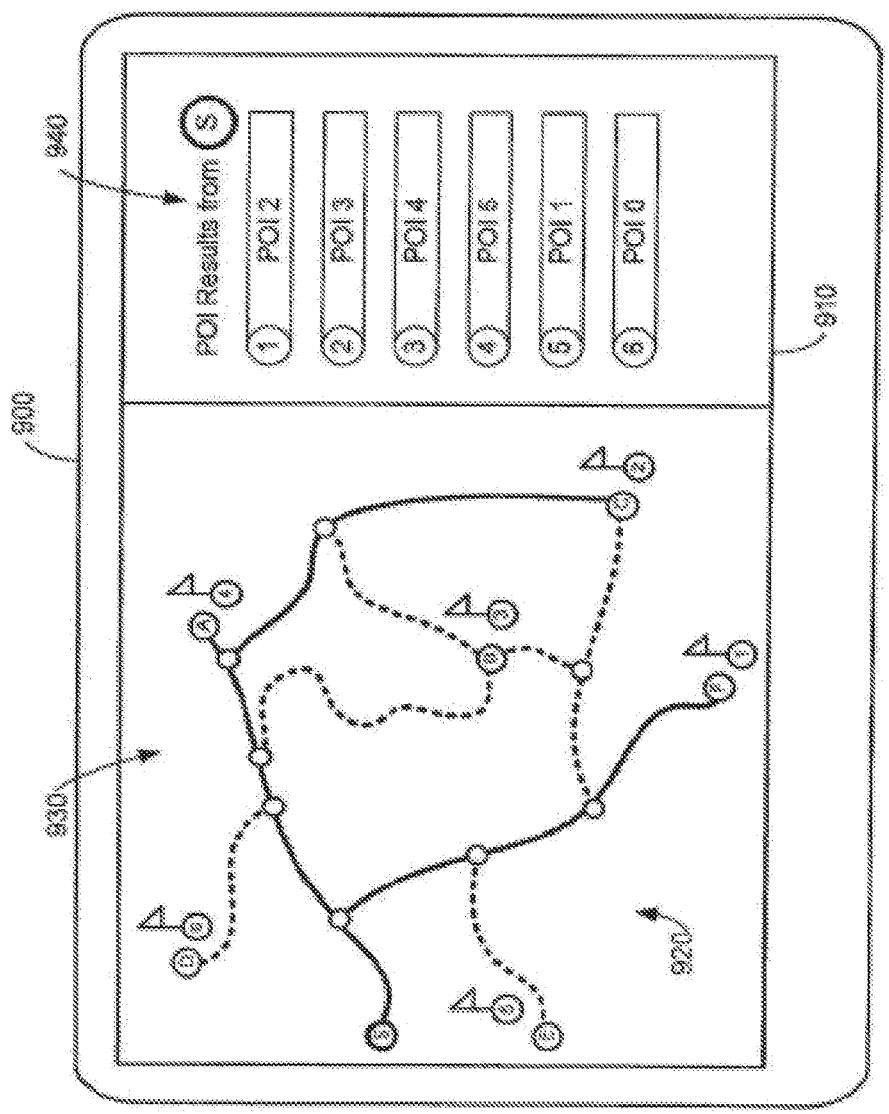
FIG. 9A is a front view of a controller that can graphically display data related to one or more points-of-interest, according to an embodiment of the invention.

FIG. 9A is a front view of a controller that can graphically display data related to one or more points-of-interest, according to an embodiment of the invention. As shown in FIG. 9A, a mobile interactive services system can include a controller 900 having a display screen 910. In some embodiments, the controller 900 can include at least a portion of the functionality provided by the controller module 210 described in FIG. 2. The display screen 910 can have a first portion 930 and a second portion 940. In other embodiments, the display screen 910 can include more or fewer portions than those described in FIG. 9A.

The first portion 930 of the display screen 910 can be used to visually or graphically represent information related to, for example, a navigation map 920. In the example shown in FIG. 9A, the navigation map 920 can include location information (e.g., towns, cities, addresses, names of places, landmarks) and road information as described in the examples in FIGS. 5, 6A, 6B, and 8. The navigation map 920 can include data related to the POIs as described in FIG. 8. The second portion 940 of the display screen 910 can be used to graphically or visually represent, for example, the relative organization of the POIs that results from considering the user's travel route preferences from a starting location S. In this example, the POIs can be listed from top to bottom in order of preference. In other embodiments, different graphical representations of POI preferences can be used that may be different from those described in FIG. 9A. A user can select any one POI and need not select the POI with the highest relative preference. In one embodiment, the display screen 910 can be a touch screen, for example, such that a user can select one of the POIs through the display screen 910. In another embodiment, the controller 900 can include buttons that can be used to select a POI from those graphically represented on the display screen 910.

Figure 9B:
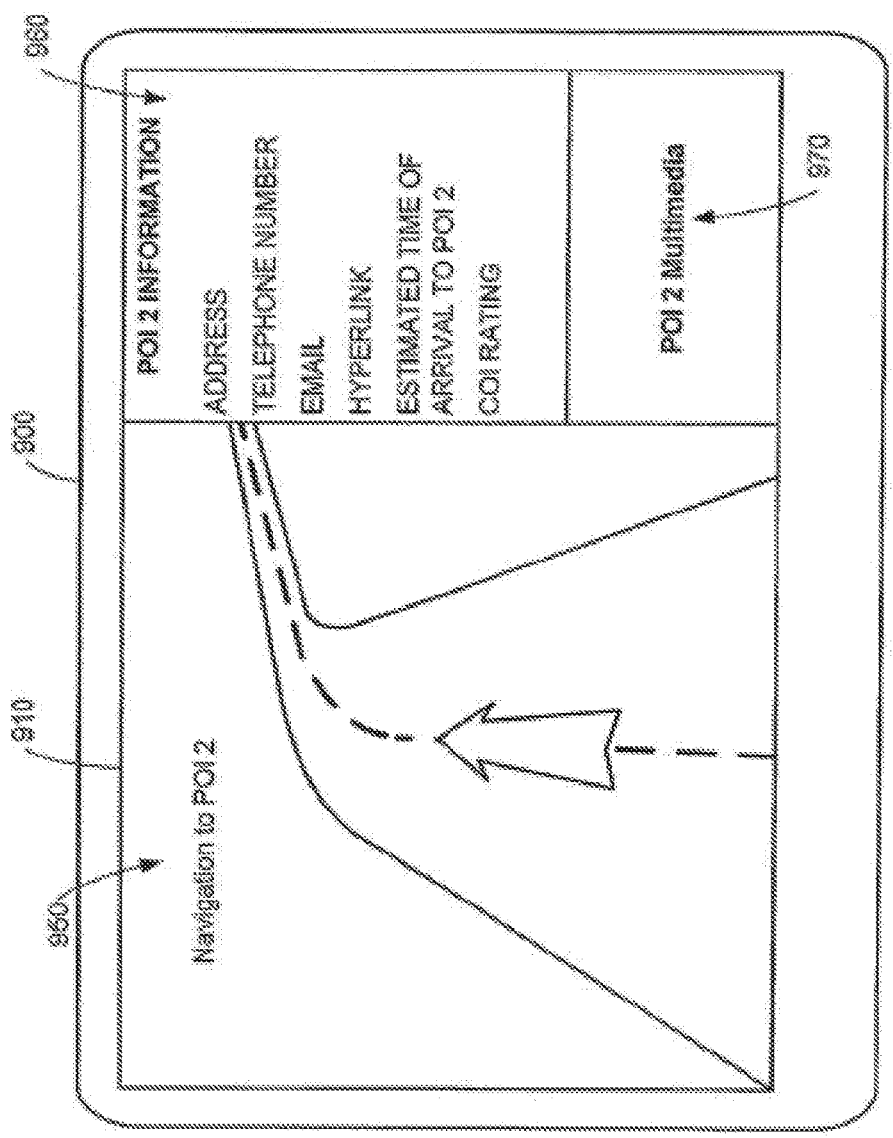
FIG. 9B is a front view of a controller that can graphically display navigation data and other data related to a point-of-interest, according to an embodiment of the invention.

FIG. 9B is a front view of a controller that can graphically display navigation data and other data related to a point-of-interest, according to an embodiment of the invention. In the example shown in FIG. 9B, the user has selected or accepted POI 2 from the multiple POIs that resulted from the destination category search. The display screen 910 can be used to provide navigation or guidance data and/or additional data related to the POI 2. In this regard, the display screen 910 can have a first portion 950, a second portion 960, and a third portion 970. In other embodiments, the display screen 910 can include more or fewer portions than those described in FIG. 9B. The first portion 950 of the display screen 910 can include graphically or visually represented guidance or navigation data to assist the user in traveling from a current location S to the location of the selected POI (i.e., POI 2 in this example). The second portion 960 of the display screen 910 can include graphically or visually represented data related to the POI 2, such as, for example, an address, a telephone number, an email, a hyperlink to a website, an estimated time of arrival at POI 2, and/or a community-of-interest (COI) rating and/or review of the POI when available. The third portion 970 of the display screen 910 can include, for example, multimedia information (e.g., advertisement, offers, commercial logos, audio content) related to the POI 2.

Figure 9C:
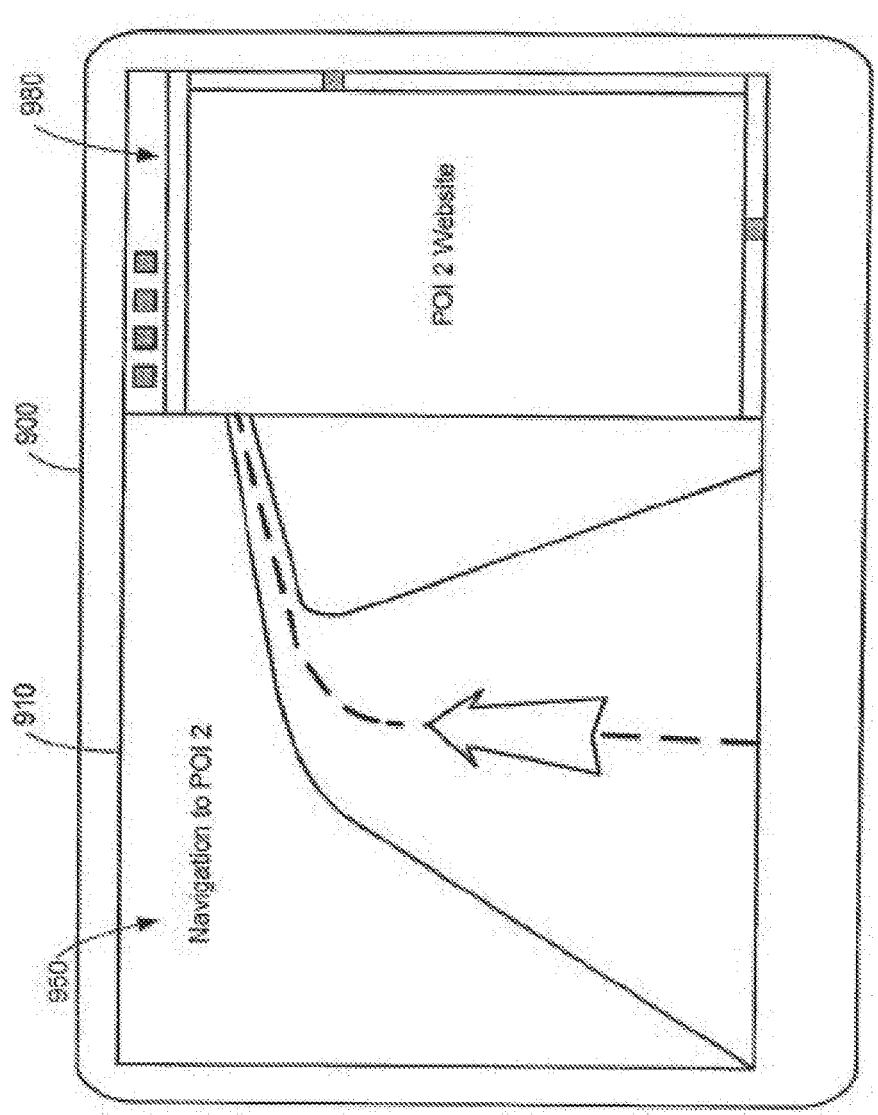
FIG. 9C is a front view of a controller that can graphically display navigation data and website data related to a point-of-interest, according to another embodiment of the invention.

FIG. 9C is a front view of a controller that can graphically display navigation data and website data related to a selected point-of-interest, according to another embodiment of the invention. In the example shown in FIG. 9C, the display screen 910 can be used to provide navigation or guidance data and/or additional data related to the selected POI (i.e., POI 2 in this example). In this regard, the display screen 910 can have a first portion 950 and a second portion 980. In other embodiments, the display screen 910 can include more or fewer portions than those described in FIG. 9C. As shown in FIGS. 9B and 9C, the first portion 950 of the display screen 910 can include graphically or visually represented guidance or navigation data to assist the user in traveling from a current location S to the location of POI 2. The second portion 980 of the display screen 910 in FIG. 9C can include, for example, a website related to the POI 2. In this regard, the website of POI 2 shown in FIG. 9C may have been displayed from the user selecting a hyperlink, such as the hyperlink described in FIG. 9B, for example.

Figure 9D:
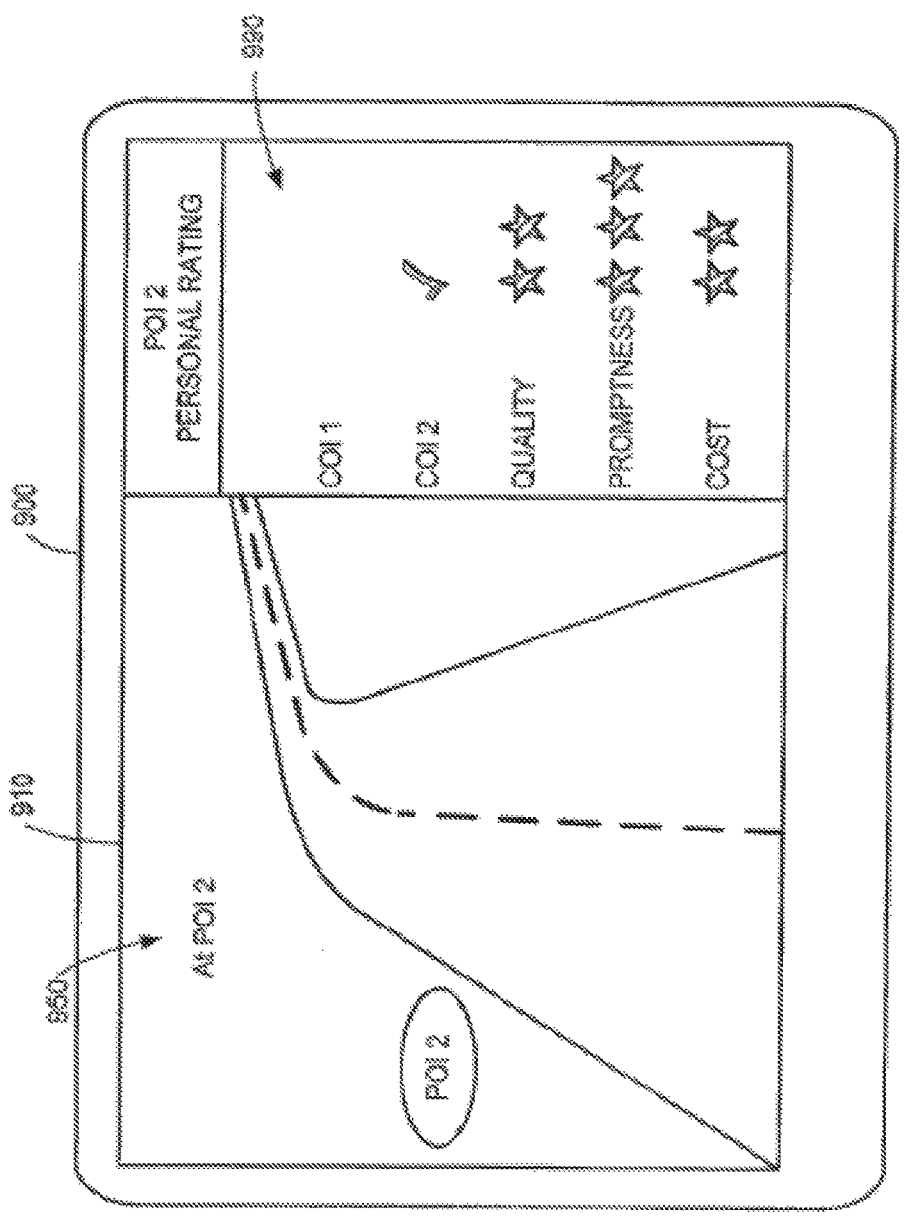
FIG. 9D is a front view of a controller that can graphically displaying feedback data provided to a community-of-interest related to a point-of-interest, according to an embodiment of the invention.

FIG. 9D is a front view of a controller that can graphically display feedback data provided to a community-of-interest related to a selected point-of-interest, according to an embodiment of the invention. In the example shown in FIG. 9D, the display screen 910 can be used to provide navigation or guidance data, to provide additional data related to selected POI (i.e., POI 2 in this example), and/or to submit data related to the selected POI. In this regard, the display screen 910 can have a first portion 950 and a second portion 990. In other embodiments, the display screen 910 can include more or fewer portions than those described in FIG. 9D. As shown in FIGS. 9B-9D, the first portion 950 of the display screen 910 can include graphically or visually represented guidance or navigation information to assist the user in traveling from current a location S to the location of POI 2. In FIG. 9D, the user has arrived at POI 2. The second portion 990 of the display screen 910 can include, for example, graphically or visually represented data to assist the user in submitting information related to POI 2, such as a personal ratings and/or reviews, for example. For instance, the user can belong to one or more communities that share common interests (e.g., parents with young children groups, retired people groups, traveling bands groups). These communities can share with its members the ratings and/or reviews of particular POIs. In this regard, the second portion 990 can be used to select a community-of-interest (COI) and to provide the selected COI with a personal rating and/or review of services and/or facilities associated with POI 2 (e.g., quality of service, promptness, cost, cleanliness).

Figure 10:
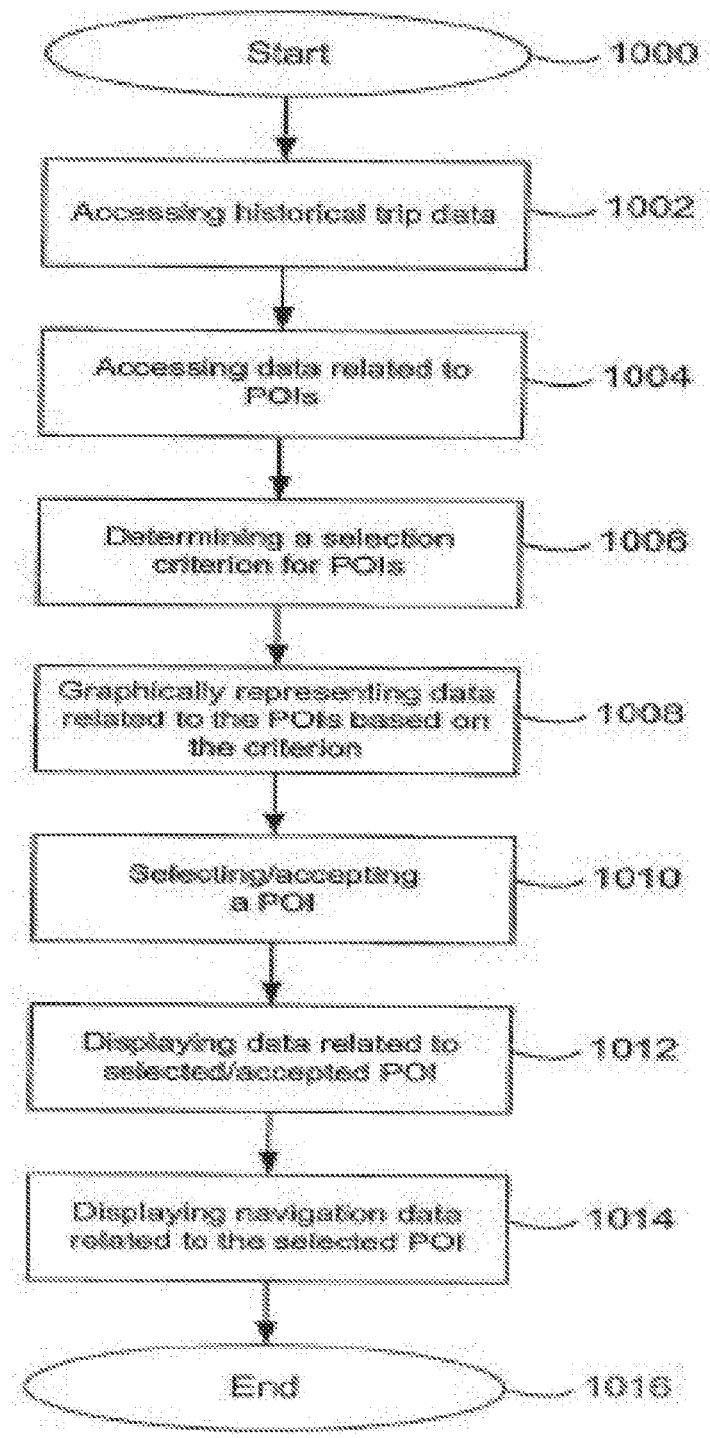
FIGS. 10-11 are flow charts illustrating a method according to an embodiment of the invention.

FIG. 10 is a flow chart illustrating a method for selecting a POI based on historical trip data, according to an embodiment of the invention. At 1002, after start 1000, a mobile interactive services system that supports navigation services can access historical trip data, such as trip data related to departure time, arrival time, time and/or date of travel, travel distances, starting and/or destination locations, route segments, destination areas, and/or navigation or guidance data provided for previously occurring trips, for example. The historical trip data can be accessed from memory in the mobile interactive services system and/or through a hybrid satellite/terrestrial mobile communication network, for example. In some instances, the historical trip data can include processed historical trip data such as routine route segment data and/or routine destination area data.

At 1004, data related to one or more POIs can be accessed by the mobile interactive services system. The POI data can result from a search of a selected destination category through a navigation service. The POI data can include information related to multiple POIs such as location of a POI, name, contact information (e.g., telephone number, fax number, email, text messaging, hyperlinks), and/or ratings or reviews provided by one or more communities or groups (e.g., COI ratings). The POI data can be accessed from memory in the mobile interactive services system and/or through a hybrid satellite/terrestrial mobile communication network, for example. In this regard, the POI data can be received from a navigation service provider.

At 1006, at least one criterion can be used for selecting a POI. The criterion or criteria can be based on historical trip data, user preferences, and/or other data related to the POIs, such as ratings or reviews, for example. In this regard, at least one criterion can be determined by providing a weight or weighting factor to one or more aspects of the historical trip data, the user preferences, and/or other data related to the POIs. In some embodiments, routine route segments, routine destination areas, and/or ratings or reviews can be weighted more heavily to reflect the user's travel preferences.

At 1008, the mobile interactive services system can graphically represent data related to the POIs based on, at least partially, at least one criterion determined for POI selection. For example, a display screen can be used to graphically represent the location of the POIs. The display screen can also be used to graphically represent POI information, such as name, for example, in a manner that illustrate relative POI preferences based on the criterion or criteria. At 1010, a user can select or accept a POI based on the criterion and/or other POI data. In one embodiment, a user can activate a portion of the mobile interactive services system, such as a touch-screen or a button, to indicate which of the POIs is being selected. In another embodiment, the mobile interactive services system can determine a preferred POI based on the criterion or criteria and can provide the user with the option of accepting the preferred POI. The user need not accept the preferred POI and the mobile interactive services system can present subsequent options of POIs (e.g., according to relative criterion preference) until the user accepts one. At 1012 and 1014, the mobile interactive services system can graphically represent data related to the selected or accepted POI. For example, the mobile interactive services system can provide the user with navigation or guidance information, data related to the selected POI (e.g., address and contact information, hyperlinks, websites, and/or multimedia content). After 1014, the method can proceed to end 1016.

Figure 11:
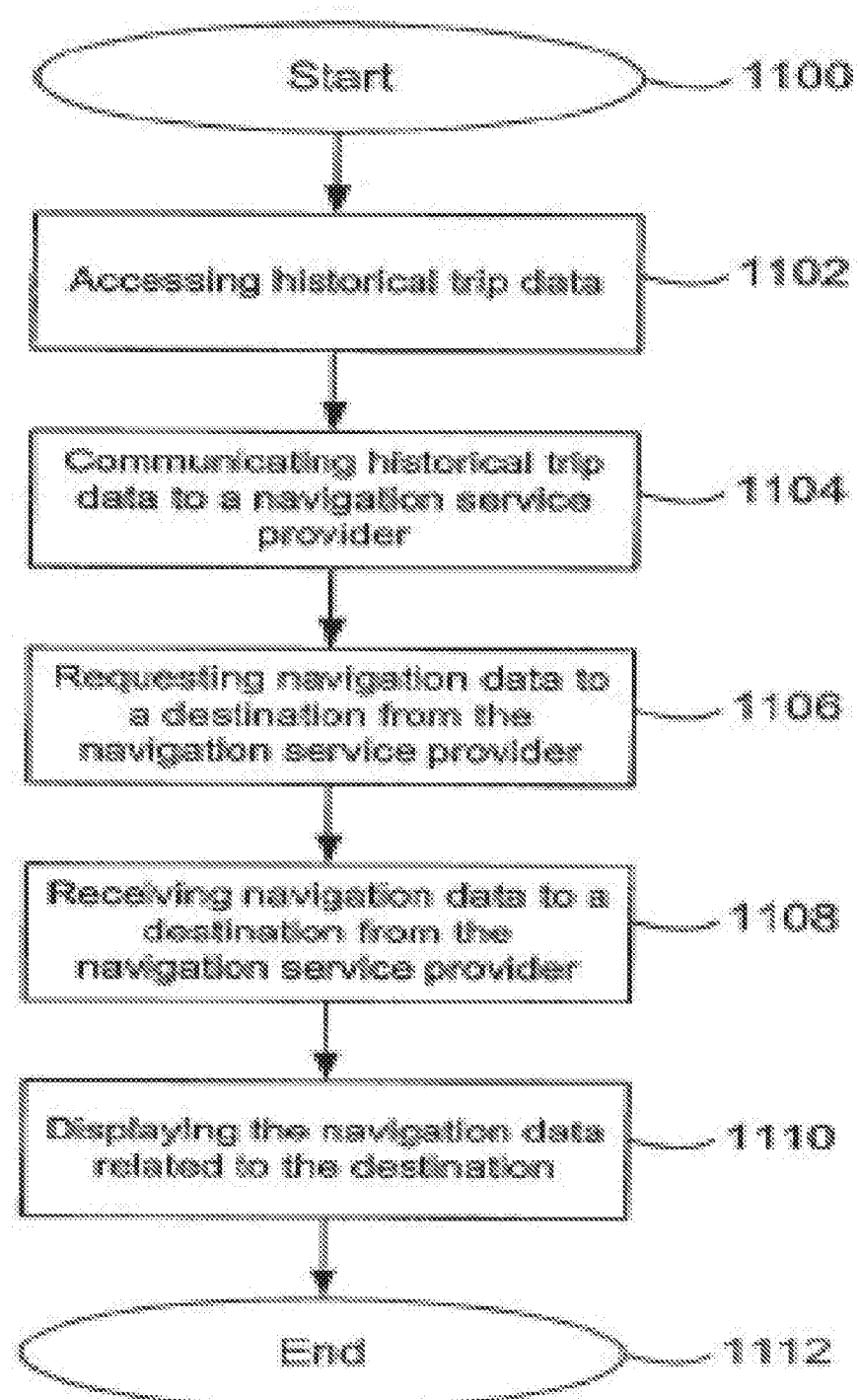

FIG. 11 is a flow chart illustrating a method for obtaining navigation data to a destination point based on historical trip data, according to an embodiment of the invention. At 1102, after start 1100, a mobile interactive services system can access historical trip data from memory in the mobile interactive services system, for example. In some instances, the historical trip data can include processed historical trip data such as routine route segment data and/or routine destination area data.

At 1104, the historical trip data can be communicated to a navigation service provider through a hybrid satellite/terrestrial mobile communication network, for example. The navigation service provider can process the historical trip data, including determining statistical information to identify routine or regularly occurring trips, for example. At 1106, a user can request navigation data for a specified location or destination from the navigation service provider via the hybrid satellite/terrestrial mobile communication network. At 1108, the navigation service provider can generate navigation data for the user-specified location based, at least partially, on the historical trip data received. The mobile interactive services system can receive the navigation data generated by the navigation service provider through the hybrid satellite/terrestrial mobile communication network. At 1110, the mobile interactive services system can graphically represent the navigation data, including travel directions or guidance and/or additional data related to the specified destination. In this regard, the navigation service provider can update the navigation data to, for example, reflect changes in the user's location and/or to indicate changes in remaining travel time and/or distance to travel to arrive at the destination location. After 1112, the method can proceed to end 1114.

In one embodiment, a processor in a mobile interactive navigation service can be operated to process at least one criterion for multiple of POIs based on historical trip data. The historical trip data can include route segment data and destination area data. An input device can also be coupled to the processor and can be operated to detect a selection of one of the graphically represented POIs. A modem can be coupled to the processor and can be operated to receive data related to the POIs from a hybrid satellite/terrestrial mobile communication network. In some instances, the criterion or criteria can be based on a portion of the route segment data related to travel to the one of the POIs from a current location, the portion of the destination area data related to a location of the POIs, and/or a rating provided by a COI. The processor can be operated to process a preferred POI based on the at least one criterion. A display can be coupled to the processor that can be configured to graphically represent the multiple POIs based on the criterion or criteria. The graphically represented data can include, for example, data related to a preferred POI, data related to the POIs in an order that is based on the criterion, and data related to the selected POI.

In another embodiment, a processor in a mobile interactive navigation service can be operated process navigation data to a destination for graphical representation in a display. The navigation data can be based on historical trip data and the historical trip data can include route segment data and destination area data. The processor can access the navigation data from memory and/or through a hybrid satellite/terrestrial mobile communication network. In this regard, the memory can be operated to store navigation data, historical trip data, and/or data related to a previously conducted trip. The processor can process data related to a previously conducted trip to generate historical trip data. In some instances, the processor can process the historical trip data for communication to a navigation service provider through the hybrid satellite/terrestrial mobile communication network and via a modem coupled to the processor. The modem can also receive navigation data from the service provider through the hybrid satellite/terrestrial mobile communication network. The navigation data received from the service provider can be based on a portion of the route segment data related to travel to the destination from a current location and/or a portion of the destination area data related to a location of the destination. The navigation data received from the service provider can be updated based on historical trip data, traffic data, and/or user deviations from previously provided navigation data.

In another embodiment, a processor in a mobile interactive services system can be programmed to process at least one criterion for each of multiple POIs based on historical trip data. The historical trip data can include route segment data and/or destination area data. The processor can be programmed to process the criterion or criteria for the POIs to provide a graphical representation of the POIs. The processor can be programmed to process a selection of one of the graphically represented POIs.

CONCLUSION

While various embodiments of the invention have been described above, it should be understood that they have been presented by way of example only, and not limitation. For example, the mobile interactive services device described herein can include various combinations and/or sub-combinations of the components and/or features of the different embodiments described. Although described with reference to use with an MSS/ATC system, it should be understood that the mobile interactive navigation services and the mobile interactive services device, as well as the methods of using the mobile interactive navigation services and the mobile interactive services device can be used with other wireless network systems.

Embodiments of a mobile interactive navigation service can also be provided without the mobile interactive services device described herein. For example, a mobile interactive navigation service can be configured to be used with other suitable controllers, vehicle consoles, handheld devices, and/or laptop computers, not specifically described herein. Data from a mobile interactive navigation service can be accessed, processed, displayed, and/or selected in a different manner than as illustrated and described herein. A mobile interactive navigation service can also be provided with other interactive features and/or services such as, for example, travel assistance services.

Some embodiments include a processor and a related processor-readable medium having instructions or computer code thereon for performing various processor-implemented operations. Such processors can be implemented as hardware modules such as embedded microprocessors, microprocessors as part of a computer system, Application-Specific Integrated Circuits ("ASICs"), and Programmable Logic Devices ("PLDs"). Such processors can also be implemented as one or more software modules in programming languages as Java, C++, C, assembly, a hardware description language, or any other suitable programming language.

A processor according to some embodiments includes media and computer code (also can be referred to as code) specially designed and constructed for the specific purpose or purposes. Examples of processor-readable media include, but are not limited to: magnetic storage media such as hard disks, floppy disks, and magnetic tape; optical storage media such as Compact Disc/Digital Video Discs ("CD/DVDs"), Compact Disc-Read Only Memories ("CD-ROMs"), and holographic devices; magneto-optical storage media such as optical disks, and read-only memory ("ROM") and random-access memory ("RAM") devices. Examples of computer code include, but are not limited to, micro-code or microinstructions, machine instructions, such as produced by a compiler, and files containing higher-level instructions that are executed by a computer using an interpreter. For example, an embodiment of the invention may be implemented using Java, C++, or other object-oriented programming language and development tools. Additional examples of computer code include, but are not limited to, control signals, encrypted code, and compressed code.

The invention claimed is:

1. A device for routing a user from a first location to a point-of-interest via one or more route segments, comprising:
   a processor;
   a memory module communicatively coupled to the processor and configured to store a point-of-interest (POI), user historical trip data, at least one user routing preference, and processor executable instructions;
   an interface module; and
   a wireless communications module communicatively coupled to a navigation service provider;
   wherein the processor executable instructions include instructions for:
      accessing the POI from the memory module;
      identifying, using the wireless communications module, a destination area in which the POI is located;
         wherein the destination area includes a first route segment connected by a first node to a second route segment;
      determining, in view of the user historical trip data, whether at least one of the first route segment and the second route segment is a routine route segment;
         wherein each of the first route segment and the second route segment provides at least a portion of a route between a first location and the POI;
      designating, in view of the at least one user routing preference, at least one of the first route segment and the second route segment as a preferred route segment;
      determining a first route, via the first node, from the first location to the POI using at least one designated preferred route segment; and
      outputting to the interface module at least one navigation instruction navigating the user to the POI via the node using the first route.

2. The device of claim 1,
wherein the destination area is a routine destination area.

3. The device of claim 2,
wherein the designation of the destination area as a routine destination area varies based on at least one of a time of day and day.

4. The device of claim 1,
wherein the at least one navigation instruction is humanly perceptible.

5. The device of claim 1,
wherein the processor executable instructions include instructions for:
   receiving an indication of at least one website, wherein the at least one website identifies information relating to the POI;
   establishing a communications link with the at least one website;
   accessing, via the at least one website, information relating to the POI; and outputting, via at least one display device communicatively coupled to the interface module, at least a portion of the information relating to the POI.

6. A device for routing a user from a first location to a point-of-interest via one or more route segments, comprising:
a processor;
a memory module communicatively coupled to the processor and configured to store a point-of-interest (POI), user historical trip data, at least one user routing preference, and processor executable instructions;
an interface module; and
a wireless communications module communicatively coupled to a navigation service provider;
wherein the processor executable instructions include instructions for:
accessing the POI from the memory module;
identifying, using the wireless communications module, a destination area in which the POI is located:
wherein the destination area includes a first route segment connected by a first node to a second route segment;
determining, in view of the user historical trip data, whether at least one of the first route segment and the second route segment is a routine route segment, and each of the first route segment and the second route segment provides at least a portion of a route between a first location and the POI;
designating, in view of the at least one user routing preference, at least one of the first route segment and the second mute segment as a preferred route segment;
determining a first route, via the first node, from the first location to the POI using at least one designated preferred route segment; and
outputting to the interface module at least one navigation instruction navigating the user to the POI via the node using the first route;
wherein the POI is located within two destination areas and the processor executable instructions include instructions for selecting a second route between the first location and the POI based on whether either of the two destination areas is a preferred destination area.

7. The device of claim 6,
wherein a preferred destination area is a destination area into which the user routinely travels for purposes of at least work.

8. The device of claim 7,
wherein the second route is the same as the first route.

9. A device for routing a user from a first location to a point-of-interest via one or more route segments, comprising:
a processor;
a memory module communicatively coupled to the processor and configured to store a point-of-interest (POI), user historical trip data, at least one user routing preference, and processor executable instructions;
an interface module; and
a wireless communications module communicatively coupled to a navigation service provider;
wherein the processor executable instructions include instructions for:
accessing the POI from the memory module;
identifying, using the wireless communications module, a destination area in which the POI is located:
wherein the destination area includes a first route segment connected by a first node to a second route segment;
determining, in view of the user historical trip data, whether at least one of the first route segment and the second route segment is a routine route segment, and each of the first route segment and the second route segment provides at least a portion of a route between a first location and the POI;
designating, in view of the at least one user routing preference, at least one of the first route segment and the second route segment as a preferred route segment;
determining a first route, via the first node, from the first location to the POI using at least one designated preferred route segment; and
outputting to the interface module at least one navigation instruction navigating the user to the POI via the node using the first route;
wherein the destination area is a dynamic destination area that defines a geographic area including at least one of the first node and one or more second nodes,
wherein the nodes located within the dynamic destination area are statistically determined based on the user historical trip data.

10. The device of claim 9,
wherein the nodes located within the dynamic destination area vary over at least one of time of day and day.

11. A system for using routine driving information to route a user from a first location to a second location, comprising:
a processor;
at least one memory module communicatively coupled to the processor and configured to store processor executable instructions and at least one user routing preference;
at least one radio for receiving navigation data from a navigation service provider;
wherein the processor executes at least one instruction to:
store statistical information associated with a user routinely traveling between a first location and a second location using at least one route segment;
designate, based on the statistical information, at least one of the route segments as a routine route segment;
access the navigation data; and
select, based on the navigation data and the at least one user routing preference, a first route between the first location and the second location using at least one of the designated routine route segments.

12. The system of claim 11,
wherein the statistical information is based on historical information associated with at least one of the route segments on the first route.

13. The system of claim 12,
wherein the navigation data includes a current condition for at least one of the route segments on the first route and the selection of the first route is based on at least the current condition.

14. The system of claim 13, comprising:
an interface module;
wherein the processor executes at least one instruction instructing the interface module to output at least one navigation direction; and
wherein the navigation direction directs the user from the first location to a second location along the first route.

15. The system of claim 14,
wherein the navigation direction is output in a humanly perceptible form.

16. A system for using routine driving information to route a user from a first location to a second location, comprising:
- a processor;
- at least one memory module communicatively coupled to the processor and configured to store processor executable instructions and at least one user routing preference;
- at least one radio for receiving navigation data from a navigation service provider;
- wherein the processor executes at least one instruction to:
  - store statistical information associated with a user routinely traveling between a first location and a second location using at least one route segment;
  - designate, based on the statistical information, at least one of the route segments as a routine route segment;
  - access the navigation data; and
  - select, based on the navigation data and the at least one user routing preference, a first route between the first location and the second location using at least one of the designated routine route segments;
- wherein the statistical information is based on historical information associated with at least one of the route segments on the first route;
- wherein each of the plurality of route segments connects to at least one node located within one or more destination areas;
- wherein the processor executes at least one processor executable instruction to:
  - determine whether each of the one or more destination areas is a routine destination area; and
  - select the first route between the first location and the second location using at least one routine route segment that connects to at least one node located within a routine destination area.

17. The system of claim 16,
wherein user historical trip data is utilized to determine whether the one or more destination areas are routine destination areas.

18. The system of claim 16,
wherein the nodes located within the one or more destination areas dynamically changes based on at least one of time of day and day.

19. The system of claim 18,
wherein at the least one user routing preference identifies whether at least one of the one or more destination areas is a preferred destination area.

20. The system of claim 19,
wherein at least one of the one or more destination areas are rated according to one or more specified criteria.

21. The system of claim 20,
wherein the identification of the preferred destination areas varies based on at least one of time of day and day.

22. The system of claim 21,
wherein the navigation data includes a current condition for at least one of the route segments and the selection of the first route is based on at least the current condition.

* * * * *